(12) United States Patent
Mizoguchi

(10) Patent No.: US 9,639,316 B2
(45) Date of Patent: May 2, 2017

(54) SYSTEM INCLUDING SERVER AND PRINTING APPARATUS, PRINTING APPARATUS, AND CONTROL METHOD THAT CONTROLS PRINTING OF ACCESS INFORMATION

(71) Applicant: CANON KABUSHIKI KAISHA, Tokyo (JP)

(72) Inventor: Shigeru Mizoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/742,522

(22) Filed: Jun. 17, 2015

(65) Prior Publication Data

US 2015/0370513 A1     Dec. 24, 2015

(30) Foreign Application Priority Data

Jun. 20, 2014     (JP) ................................ 2014-127489

(51) Int. Cl.
*G06F 3/12*          (2006.01)
*G06F 21/60*         (2013.01)

(52) U.S. Cl.
CPC .......... *G06F 3/1285* (2013.01); *G06F 3/1222* (2013.01); *G06F 3/1238* (2013.01); *G06F 21/608* (2013.01)

(58) Field of Classification Search
CPC combination set(s) only.
See application file for complete search history.

(56) References Cited

U.S. PATENT DOCUMENTS

| 2012/0117629 A1* | 5/2012 | Miyazawa | H04L 63/08 726/4 |
| 2013/0003106 A1* | 1/2013 | Nishida | G06F 3/1222 358/1.14 |

FOREIGN PATENT DOCUMENTS

JP          2012-113696 A      6/2012

* cited by examiner

*Primary Examiner* — Henok A Shiferaw
(74) *Attorney, Agent, or Firm* — Canon USA Inc., IP Division

(57) ABSTRACT

Print control of access information for which a valid period is set is performed properly. A printing apparatus acquires access information which is to be used for accessing a server and which has a valid period set for the access. If an elapsed time from the acquisition of the access information exceeds a predetermined time, the printing apparatus does not print the access information even if the valid period has not expired. If the elapsed time does not exceed the predetermined time, the printing apparatus prints the access information.

21 Claims, 16 Drawing Sheets

FIG. 4

[ACQUIRED DATA]

"device_code":"4/abcdeFGHIJKX_sN8Fdf7_SkCgduA",
"user_code":"iwbvk3cb",
"verification_url":"http://www.PhotoXxxx.com/device",
"expires_in":1800,
"interval":5

FIG. 5

[InvitePage PRINT INFORMATION]

**************
Photo Xxxx
**************

"URL": http://www.PhotoXxxx.com/device
"User Code": "iwbvk3cb"

FIG. 12

| PRINTING ORDER | JOB ID | VALID PERIOD | |
|---|---|---|---|
| | | PRESENT/ABSENT | EXPIRY TIME |
| 1 | 101 | ABSENT | – |
| 2 | 102 | PRESENT | 10/31 12:40 |
| 3 | 103 | ABSENT | – |
| 4 | 104 | ABSENT | – |
| 5 | 105 | PRESENT | 10/31 12:30 |

FIG. 13

| PRINTING ORDER | JOB ID | VALID PERIOD | |
|---|---|---|---|
| | | PRESENT/ABSENT | EXPIRY TIME |
| 1 | 105 | PRESENT | 10/31 12:30 |
| 2 | 101 | ABSENT | – |
| 3 | 102 | PRESENT | 10/31 12:40 |
| 4 | 103 | ABSENT | – |
| 5 | 104 | ABSENT | – |

FIG. 15

| PRINTING ORDER | JOB ID | VALID PERIOD | |
| --- | --- | --- | --- |
| | | PRESENT/ABSENT | EXPIRY TIME |
| 1 | 102 | PRESENT | 10/31 12:40 |
| 2 | 105 | PRESENT | 10/31 12:48 |
| 3 | 101 | ABSENT | – |
| 4 | 103 | ABSENT | – |
| 5 | 104 | ABSENT | – |

IN THE CASE OF GET https://PhotoXxxx.com/data/feed/api/user/[(1)account]?kind=[(2)service]&oauth_token=[(3)access token]

SYSTEM INCLUDING SERVER AND PRINTING APPARATUS, PRINTING APPARATUS, AND CONTROL METHOD THAT CONTROLS PRINTING OF ACCESS INFORMATION

BACKGROUND OF THE INVENTION

Field of the Invention

The present invention relates to a print control device, a print control method, and a program which cause a printing apparatus to print access information for accessing an external device.

Description of the Related Art

There is a case in which authentication processing for registering user information is performed in order to utilize a service provided on an Internet site. As such authentication processing, a method for issuing a right of use as an access token is available.

Japanese Patent Laid-Open No. 2012-113696 describes a technique in which when a user inputs, using a multifunction printer (MFP), a provisional registration ID acquired by a personal computer (PC), a Web server which provides a service issues an access token to the MFP.

A method for registering a right of use as described below is also available. First, a server which provides a service transmits to a client apparatus a uniform resource locator (URL) of an authentication page for granting a right of use (invite_page_url, hereinafter, referred to as an authentication URL). The authentication URL is presented to a user when it is displayed or printed by the client apparatus. Then, the user accesses the authentication page in accordance with the authentication URL, by using an apparatus provided with a browsing function, and requests the server to issue an access token. In response to the request, the server issues the access token to the client apparatus. Accordingly, the client apparatus becomes able to utilize the service by using the access token issued as described above.

In the server which provides a service as described above, in order to reduce the risk that the authentication URL is utilized by a third party who is not the user of the client apparatus, a validity period may be set for authentication processing using the authentication URL.

However, for example, in the case where the authentication URL is printed by a printer, a long time may be required to perform printing, due to various factors including waiting for permission of printing by the user, waiting for completion of another printing process, recovering from various errors, and preparation for a recording material and a paper sheet, and the like. Thus, when printing of the authentication URL is completed and the user accesses the authentication page in accordance with the authentication URL, the valid period for authentication based on the authentication URL may have already expired.

If the valid period of the authentication URL expires, not only acquisition of the right of use (access token) will fail but also a paper sheet and a recording material used to print the authentication URL will be wasted.

SUMMARY OF THE INVENTION

The present invention provides proper print control of access information for which a valid period is set.

Accordingly, in a system according to an aspect of the present invention, a server includes a transmission unit configured to transmit to the printing apparatus access information which is to be used for accessing the server and which has a valid period set for the access, and an execution unit configured to execute processing based on the access if the access based on the access information transmitted by the transmission unit is made before the valid period has expired. The printing apparatus includes an acquisition unit configured to acquire the access information transmitted by the transmission unit, if an elapsed time from the acquisition of the access information by the acquisition unit exceeds a predetermined time, the printing apparatus does not print the access information even if the valid period has not expired, and if the elapsed time does not exceed the predetermined time, the printing apparatus prints the access information.

Further features of the present invention will become apparent from the following description of exemplary embodiments with reference to the attached drawings.

BRIEF DESCRIPTION OF THE DRAWINGS

FIG. 4 illustrates an example of information that the relay server acquires from a site A.

FIG. 5 is a diagram illustrating an example of a print medium on which an InvitePage is printed.

FIG. 12 is a diagram illustrating jobs within a spooler.

FIG. 13 is a diagram illustrating print jobs after the printing order is changed.

FIG. 15 is a diagram illustrating print jobs after the printing order is changed by the processing of step 1401.

DESCRIPTION OF THE EMBODIMENTS

Hereinafter, embodiments of the present invention will be described in detail.

First Embodiment

Figure 1:
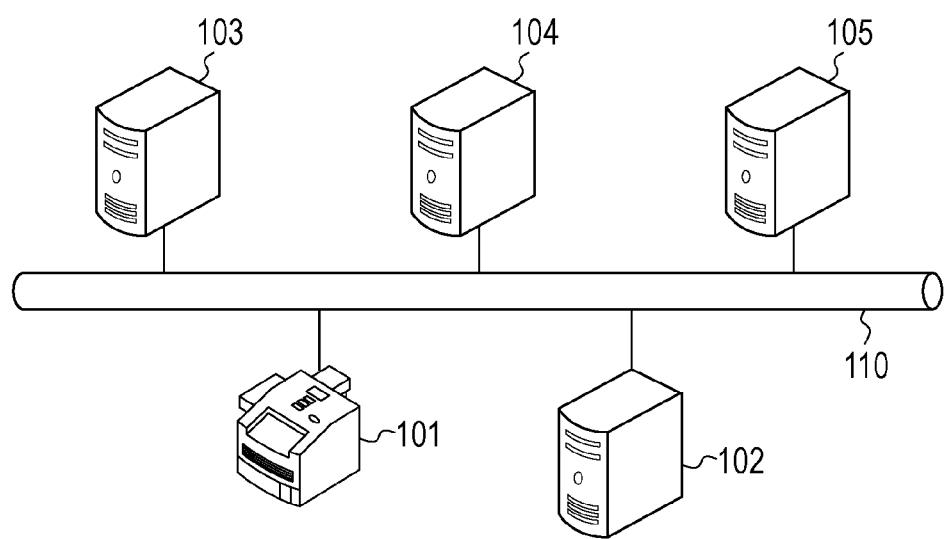
FIG. 1 is a diagram illustrating an example of a system configuration according to an embodiment.

Hereinafter, a first embodiment of the present invention will be described in detail with reference to figures. FIG. 1 is a diagram illustrating an example of a system configuration according to the first embodiment.

An MFP 101 is connected to a relay server 102 via the Internet 110, and is connected, via the relay server 102, to a picture sharing site (hereinafter, referred to as "site") as a Web application server. The server of the site stores images uploaded from devices, such as a PC, a smartphone, and a tablet. The MFP 101 is capable of downloading images from such a server and printing the images by utilizing a service provided by the site. The MFP 101 is also capable of uploading read images, which are obtained by reading documents, to such a server.

In order for the MFP 101 to utilize such a service, it is necessary to register the MFP 101 with a site A 103 or a site B 104. Specifically, an access token which corresponds to an account of the MFP 101 needs to be issued to the MFP 101, as the right to use a service provided by the site. The access token includes account information of the MFP 101 and information for specifying a service available with the access token. When utilizing a service provided by the site, the MFP 101 transmits the access token, together with a use request, to the server of the site. When the account information included in the access token matches an account registered with the server, the server permits to provide the service to the MFP 101. In the first embodiment, the issuance of an access token is executed by OAuth 2.0 authentication.

In order for the MFP 101 to utilize each of the site A 103 and the site B 104, the MFP 101 needs to acquire access tokens corresponding to each site. Each of the site A 103 and the site B 104 provides a Web page for authentication to issue the corresponding access token. When the MFP 101 issues a request for issuance of an access token, information which includes a URL of the Web page for authentication and a user code is transmitted to the MFP 101, and the information is printed at the MFP 101. Communication between the MFP 101 and the site A 103 or the site B 104 is executed through the relay server 102.

In accordance with the URL printed as above, a user accesses the Web page for authentication. Specifically, a PC 105 has a browsing function, and the user inputs the URL to a Web browser of the PC 105 to access the Web page for authentication. The user does not necessarily access the authentication page by using the PC 105. The user may access the authentication page by using a device, such as a smartphone, a tablet, or a mobile phone, in place of the PC 105. If the MFP 101 has a browsing function, access using the MFP 101 is possible.

On the Web page that the user accesses using the PC 105 in accordance with the above URL, the user inputs a user account managed by the site and the user code printed as described above. Thus, the site associates the user account, as the owner's account of the MFP 101, with the MFP 101. Furthermore, an access token, as the right to use a service relating to an image corresponding to the user account, is issued to the MFP 101.

With the site A 103 and the site B 104, an image which may be provided is distinguished by the user account. That is, the site A 103 and the site B 104 are designed such that a specific image is provided to a specific user. Therefore, the authority of an access token issued to the MFP 101 is limited to the use of an image which may be browsed by the user account corresponding to the MFP 101. For example, by using the access token issued as described above, the MFP 101 is capable of printing an image that corresponds to the user account in the picture sharing site without through a PC. Specifically, the MFP 101 is capable of displaying a selection screen for selecting album/image data stored in the site, selecting an image as a printing target in accordance with a user instruction, acquiring the image from the site, and performing printing.

Furthermore, the MFP 101 does not implement an individual application programming interface (API) corresponding to each of the multiple sites but implements an API for the relay server 102. The relay server 102 communicates with the multiple sites using APIs corresponding to the individual sites. Therefore, the MFP 101 designates a site and issues a request to the relay server 102. The relay server 102 specifies the site designated by the request from the MFP 101, and acquires information from the site using the API corresponding to the site which is provided beforehand. The relay server 102 also assists the MFP 101 in processing for registering the right to use the site. Specifically, the relay server 102 notifies the site designated by the MFP 101 of a request from the MFP 101 for issuance of an access token, acquires the access token, transmits the acquired access token to the MFP 101, and the like.

[Picture Sharing Site]

As described above, the site A 103 and the site B 104 provides Web pages for authentication, and notify the MFP 101 of URLs as access information for accessing the Web pages for authentication. However, there is a risk, for example, that the user of the MFP 101 loses a print medium on which the URL is printed and the URL is used by a third party who is not the user of the MFP 101. In this case, a user account which has no relation to the MFP 101 may be associated with the MFP 101 and registered with the site. In order to avoid this, the site A 103 and the site B 104 each provide the URL to be transmitted to the MFP 101 with a valid period (for example, 30 minutes from the issuance of the URL). Therefore, the user of the MFP 101 needs to perform a registration operation of the MFP 101 within the valid period.

[MFP]

Figure 2:
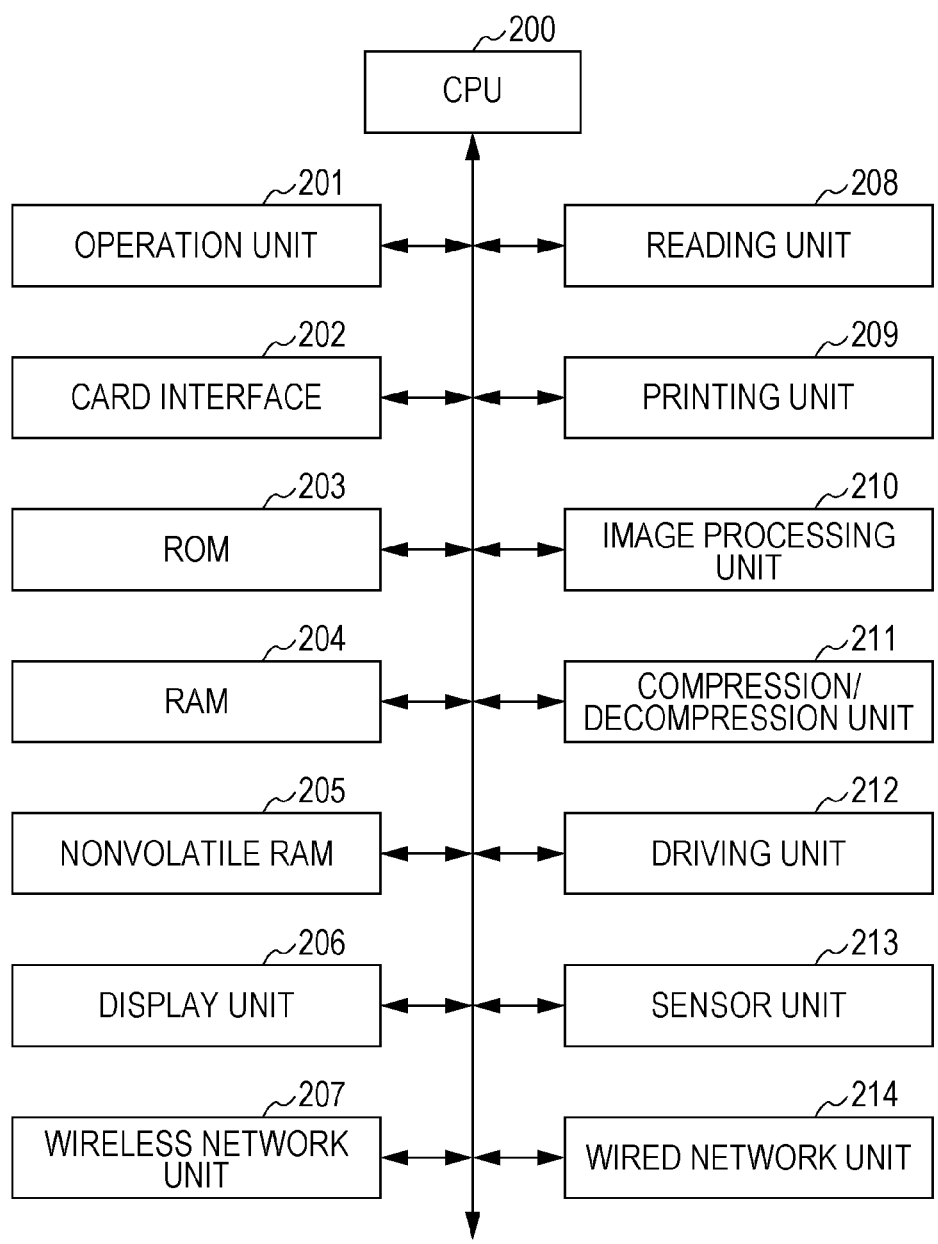
FIG. 2 is a diagram illustrating a configuration of an MFP.

FIG. 2 illustrates a configuration of the MFP 101.

The MFP 101 includes an operation unit 201, a card interface 202, a reading unit 208, and a printing unit 209. The MFP 101 also includes a central processing unit (CPU) 200, a read only memory (ROM) 203, a random access memory (RAM) 204, a nonvolatile RAM 205, a display unit 206, an image processing unit 210, a compression/decompression unit 211, a driving unit 212, and a sensor unit 213.

The CPU 200 executes on the RAM 204 a program stored in the ROM 203, in accordance with a user operation on the operation unit 201, and thereby controls the MFP 101. The ROM 203 stores a control command program of the MFP 101, and the like. Since access to an authentication page is performed by the PC 105 as described above, the ROM 203 does not need to include a program of a Web browser. In such a case, communication with the relay server 102 is executed through an API for the relay server 102. For example, applications dedicated to the use of the site A 103 and site B 104 are stored in the ROM 203, and the applications communicate with the relay server 102 through the above API. Thus, it is possible to access the site A 103 and the site B 104 through the relay server 102 even if a Web browser is not provided in the MFP 101.

The RAM 204 is used as a storage area of a spooler for print jobs and also operates as a working memory of the CPU 200 as described above.

The nonvolatile RAM 205 is a nonvolatile memory in which information acquired by the MFP 101 is stored. For example, an access token issued by a site is stored in the nonvolatile RAM 205. Therefore, even if power supply to the MFP 101 is interrupted, the access token may be stored.

Furthermore, the MFP 101 includes a wireless network unit 207 and a wired network unit 214. The wireless network unit 207 is able to wirelessly communicate with a wireless local area network (LAN) access point which conforms to a standard, such as IEEE 802.11a. The wired network unit 214 includes an Ethernet® connector which is capable of connecting a twisted pair cable, such as 100 Base-Tx.

By using the wireless network unit 207 or the wired network unit 214, the MFP 101 is able to communicate with other devices connected to the Internet using a transmission control protocol/Internet protocol (TCP/IP) technology.

The operation unit 201 is an operation device which includes a key, a touch pad, and the like to be operated by a user. The display unit 206 is a display which displays a screen for presenting images and various types of information to a user. A touch panel including the display unit 206 and a touch pad as the operation unit 201 that are integrated together may be provided.

The reading unit 208 includes an optical sensor for reading a document. With the optical sensor, a read image is generated on the RAM 204.

An ink tank for storing ink and a recording head for ejecting ink may be mounted at the printing unit 209. The printing unit 209 also includes a conveyance part for conveying a print sheet, and prints an image on a print medium by an ink jet method. The printing unit 209 does not necessarily adopt the ink jet method. For example, the printing unit 209 may print an image by an electrophotographic method.

The MFP 101 has a scanner function by the reading unit 208, in addition to a printing function by the printing unit 209. The MFP 101 also has a copying function using the reading unit 208 and the printing unit 209.

The card interface 202 is an interface, for example, to be used by a user to insert a memory card that stores an image to be printed by the printing unit 209. The image processing unit 210 executes various types of image processing for an image to be printed by the printing unit 209 or an image read by the reading unit 208. The compression/decompression unit 211 executes compression processing for an image read by the reading unite 208 or decompression processing for an image as a printing target received from an external device. The driving unit 212 causes the conveyance part included in the printing unit 209 to operate, and drives the recording head. The sensor unit 213 is a sensor for detecting the position, size, and type of the print medium being conveyed by the conveyance part.

In the first embodiment, the printing unit 209 of the MFP 101 prints on a print medium a URL with a valid period as an InvitePage. For example, in the case where the display unit 206 is a compact display, it may be difficult for a user to see a URL displayed on the display. In order to avoid this, by printing the URL on a print medium, the visibility of the URL may be enhanced. Furthermore, even in the case where the user moves to the PC 105 to input the URL, the print medium on which the URL is printed is easy to carry around, which enhances the user's operability.

Furthermore, the MFP 101 has a network communication function and has a configuration corresponding to an API of the relay server 102. Specifically, the MFP 101 issues a request, through an application executing on the MFP 101, to an API of the relay server 102, and thereby acquires authentication registration and information for a picture sharing site. Specifically, by performing HTTP POST communication with the relay server 102 through an API of the relay server 102, the MFP 101 issues various requests.

Hereinafter, APIs at the time of authentication registration of the relay server 102 and the MFP 101 will be explained. The definition of APIs is as follows:

API-20: Registration Request

A request for acquiring the right of use (access token) of a site designated by the MFP 101. A return value of the request includes information necessary for generating the InvitePage. The return value also includes polling control information (cycle and period) for the relay server 102 to wait for a response of an authentication result from the site.

API-21: Waiting for Authentication

A request for instructing the relay server 102 to wait for a response of an authentication result. The MFP 101 issues the request to the relay server 102 in response to the issuance of an InvitePage. After that, the MFP 101 waits for a response from the relay server 102 until receiving the right of use (access token) as an authentication result.

API-1000: Album Information Acquisition Request

A request for causing the relay server 102 to acquire album information (a URL of an image etc.) of the site designated by the MFP 101. The MFP 101 adds authentication information, such as an access token, which is necessary for using the site, to the request. After issuing the request, the MFP 101 enters a waiting state for the album information.

The MFP 101 issues various requests to the relay server 102 through the above APIs. Thus, without direct communication with a server of a site being performed or without an API corresponding to each site being implemented, the MFP 101 is able to issue a request to each site or acquire information from each site.

[Relay Server]

The relay server 102 is a server whose main function is an API conversion function, which acts as an intermediary for information acquisition between the MFP 101 and a site that provides a picture sharing site function as a Web application server. The relay server 102 functions as a Web server in relation to the MFP 101, whereas the relay server 102 functions as a client in relation to a server of individual picture sharing sites.

Figure 3:
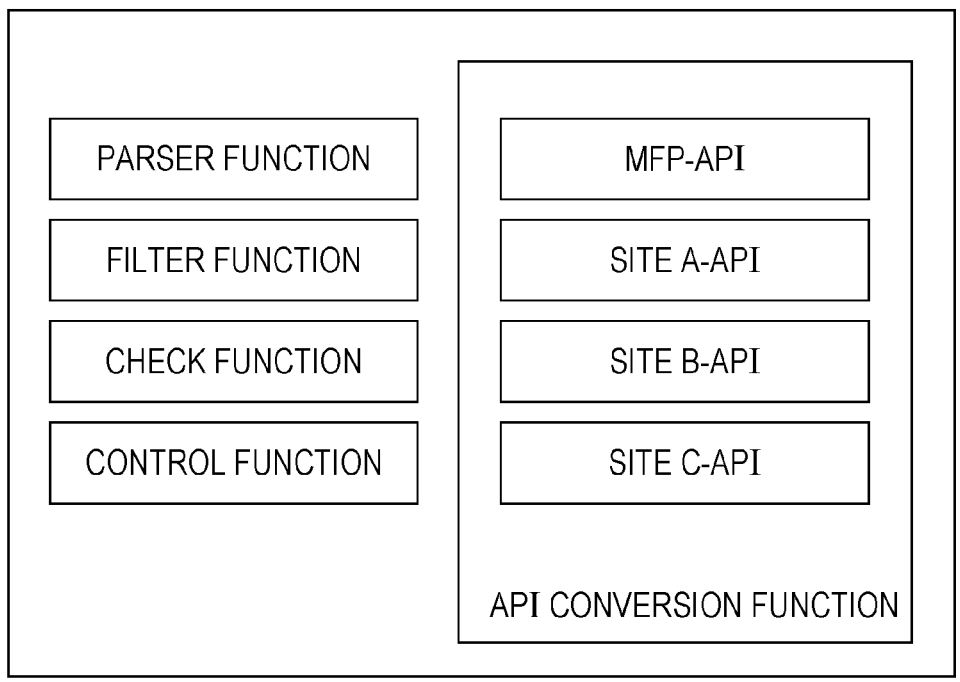
FIG. 3 is a diagram illustrating a functional configuration of an application of a relay server.

FIG. 3 is a diagram illustrating a functional configuration of an application of the relay server 102. The main function of the relay server 102 is the API conversion function. With the MFP 101, the relay server 102 defines an "MFP-API". Within the API conversion function, the relay server 102 performs conversion of information acquisition with a server of each picture sharing site of a designated connection destination, using a "site A-API" or a "site B-API" In the first embodiment, authentication registration with the site A 103 is disclosed. As for a connection request of the API-20 from the MFP 101, the relay server 102 executes login authentication for the site A 103 and acquires information. The acquired information is sent to the MFP 101.

The relay server 102 also has following functions:

Parser Function:

A function for interpreting, with a parser, an eXtensible Markup Language (XML) list, which includes information uniquely defined from individual sites.

Filter Function:

A function for deleting data other than information to be transmitted to the MFP 101, from among data acquired from individual sites. The data to be deleted includes content whose valid period has expired, image information of an undesignated file type and a file size that exceeds an upper limit, and the like.

Check Function:

A function for checking, in response to a condition check request from the MFP 101, whether or not connection to servers of individual sites is possible, based on an IP address of the MFP 101 and transmitted information.

Control Function:

A control function, such as a function for assigning to the server of a site to connect, based on destination information of the MFP 101.

The relay server 102 uses the above functions to perform communication with the MFP 101 and servers of individual sites, acquisition of information, and various requests.

Next, acquisition of an access token by the user of the MFP 101 will be explained.

Figure 6:
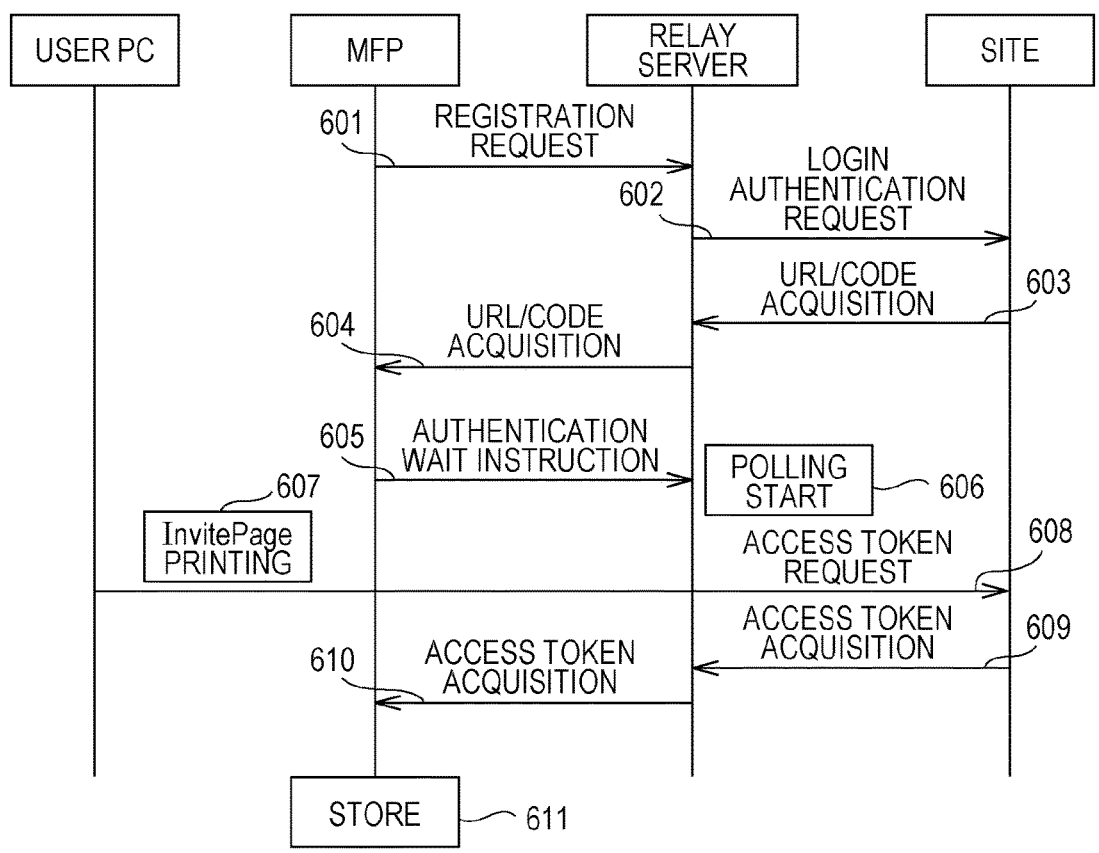
FIG. 6 is a transition diagram illustrating the period up to acquisition of a right of use (access token) by the MFP.

FIG. 6 is a transition diagram illustrating the period up to the acquisition of the right of use (access token) by the MFP 101. In an example of FIG. 6, a case where the access token is acquired from the site A 103 is illustrated. However, an access token may be acquired from the site B 104 by similar processing.

In step 601, the MFP 101 issues a registration request to the relay server 102 through the API-20. The registration request is issued by a user operation on the operation unit 201 of the MFP 101. For example, when the user activates for the first time an application corresponding to the site A 103 on the display unit 206, a registration request is issued. The registration request includes information indicating that the request is regarding the site A 103.

In step 602, the relay server 102 recognizes that the registration request is a request for registration with the site A 103, and issues a registration request to the server of the site A 103 using the "site A-API". At this time, device identification information for identifying the MFP 101 is transmitted to the server of the site A 103, and the device identification information is registered with the server. The device identification information is also registered with the relay server 102. The device identification information is transmitted to the relay server 102 together with the registration request by the MFP 101 in step 601, and is registered with the relay server 102 and the server of the site. Alternatively, in the case where information for identifying the MFP 101 has been registered with the relay server 102 beforehand, the information may be registered with the server of the site as the device identification information.

In step 603, the server of the site A 103 returns information illustrated in FIG. 4 in response to the registration request. FIG. 4 illustrates an example of information acquired by the relay server 102 from the site A 103. Part of the information is printed as an InvitePage.

A portion "device_code" is the above-mentioned device identification information for identifying the MFP 101, and is used when the relay server 102 transmits an InvitePage and an access token to the MFP 101. The portion "device_code" is registered with the relay server 102 as well as the server of the site. For example, for data transmission from the site to the MFP 101, the site transmits "device_code" to the relay server 102 along with the data. Then, the relay server 102 uses "device_code" to identify the MFP 101 from among many MFPs that the relay server 102 administrates, so that data may be transmitted to the MFP 101.

A portion "verification_url" is URL information necessary for generating an InvitePage, and is printed as the InvitePage. The URL information indicates a URL with which the user of the MFP 101 accesses an authentication page of the site A 103 using a device, such as the PC 105.

A portion "user_code" is information to be printed as the InvitePage and to be input in the authentication page that the user accesses in accordance with the URL information. Based on the authentication URL and "user_code", the server of the site is able to confirm that the user who accesses the authentication page in accordance with the authentication URL is the user who has caused printing of the InvitePage, that is, the access is made from the user of the MFP 101.

A portion "expires_in" indicates an authentication valid time and is represented in units of seconds. That is, "expires_in" represents a period of time up to the expiry time for authentication which uses "verification_url" and "user_code" from the issuance of the information illustrated in FIG. 4. The information is also used as a polling period of the relay server 102. In order to receive from the site A 103 an access token issued by the site A 103 and transmit the access token to the MFP 101, the relay server 102 executes polling to the site A. The relay server 102 executes polling during the authentication valid time. A portion "interval" indicates an interval of polling and is represented in units of seconds. The relay server 102 executes polling to the site A 103 in response to an authentication wait request issued by the MFP 101 using the API-21, and acquires the access token.

In step 604, the relay server 102 analyzes the information acquired in step 603 with the parser function, extracts information that matches the API as information necessary for the MFP 101, and transmits the extracted information. For example, information other than "device_code" is extracted.

The MFP 101 further issues to the relay server 102 an authentication wait instruction which includes polling control information through the API-21 (step 605). The polling control information indicates "expires_in" and "interval" illustrated in FIG. 4 acquired by the MFP 101 in step 604.

In response to the authentication wait instruction, the relay server 102 starts polling to the site (step 606). In step 606, the relay server 102 analyzes, with the parser function, the polling control information (cycle and period) acquired from the MFP 101, and executes polling in accordance with the polling control information. In this example, polling is performed for 30 minutes at the longest at cycles of five seconds until the access token is issued.

In step 604, the MFP 101 analyzes, using parser, the data acquired from the relay server 102, extracts information necessary for generating the InvitePage, and generates a print data of the InvitePage. Then, the MFP 101 causes the printing unit 209 to print the InvitePage on a print medium (step 607).

FIG. 5 illustrates an example of a print medium on which an InvitePage is printed. As print data, a URL and a user code are extracted from the information illustrated in FIG. 4 and printed. In addition to this example, InvitePage information may be converted into a QR Code® and printed.

The MFP 101 sets, as a reference time, the time when a response is received from the relay server 102 in step 604. Based on the elapsed time from the reference time, the MFP 101 determines whether or not to print the InvitePage. Details will be described later with reference to FIG. 7.

The user inputs the URL information described in the InvitePage printed by the MFP 101 to the PC 105 which has a browsing function, and accesses the site A 103. Then, the user requests the server of the site A 103 to grant the MFP 101 the right of use (access token) (step 608). The device which has the browsing function is not limited to the PC 105. For example, a smartphone, a mobile phone, a tablet, or other types of devices may also be used. Alternatively, if a Web browsing function is implemented in the MFP 101, an access token may be requested from the MFP 101 by inputting the URL using the operation unit 201 of the MFP 101.

When the site A 103 issues information including an authentication URL, in the relay server 102, authentication processing using the authentication URL is valid only during the authentication valid time. When the authentication valid time has passed, the MFP 101 makes a request for reissuance of an access token by performing processing which will be described later with reference to FIG. 7. The site A 103 transmits to the relay server 102 an access token and a refresh token in response to the polling immediately after the issuance of the right of use (step 609). The relay server 102 transmits the access token and the refresh token to the MFP 101 that is waiting for authentication, and the MFP 101 acquires the access token and the refresh token (step 610). The MFP 101 stores the access token and the refresh token acquired in step 610 in a storage management area of the nonvolatile RAM 205 (step 611).

The refresh token is information for reissuing an access token which has a valid period. Specifically, when the valid period of the access token has expired, the client apparatus (for example, the MFP 101) presents the refresh token to a server, and the server reissues to the client apparatus an access token corresponding to the refresh token. However, the issuance of the refresh token is not an essential configuration. When the valid period of the access token has expired, the MFP 101 may make a request for a new access token, and the new access token, which is newly created by the server, may be issued.

Figure 7:
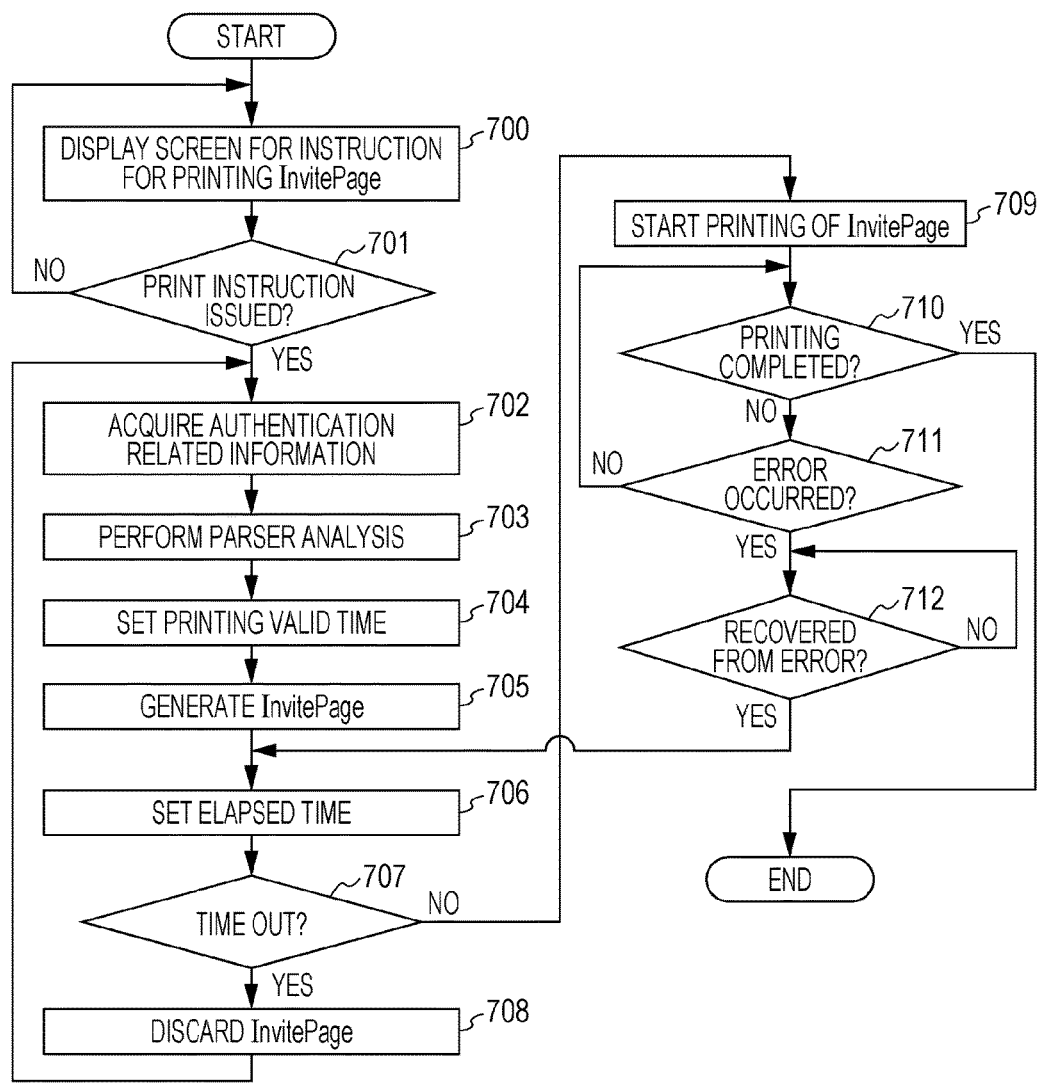
FIG. 7 is a diagram illustrating an example of a process performed by the MFP to print an InvitePage in a first embodiment.

FIG. 7 illustrates an example of a process performed by the MFP 101 to print an InvitePage in the first embodiment. A program corresponding to the process illustrated in FIG. 7 is stored in the ROM 203. The process illustrated in FIG. 7 is implemented when the CPU 200 executes the program on the RAM 204.

The flow illustrated in FIG. 7 is executed when the user issues, by using the operation unit 201, an instruction for registering the MFP 101 with the site A 103 or the site B 104. For example, when the user activates an application corresponding to the site A 103 or site B 104 for the first time, the process illustrated in FIG. 7 is executed.

In step 700, the CPU 200 causes the display unit 206 to display a screen with which the user issues an instruction for printing an InvitePage which corresponds to a service provided by the site A 103 or the site B 104.

In step 701, the CPU 200 determines whether or not the user has issued a print instruction on the screen displayed in step 700. When the user has issued the print instruction, printing of the InvitePage is permitted.

When it is determined in step 701 that the printing of the InvitePage is permitted by the user, the CPU 200 issues a registration request of the API-20 to the relay server 102, and acquires the authentication related information illustrated in FIG. 4 (step 702). The processing of step 702 corresponds the processing of steps 601 and 604 in FIG. 6. The user designates beforehand whether the registration is regarding the site A 103 or the site B 104. The registration request includes information indicating the site designated by the user. In this example, an explanation will be provided on the assumption that the user designates the site A 103 for registration.

In step 702, the CPU 200 starts measuring a time from the acquisition of the authentication related information. In step 706, which will be described later, the time measured in such a way is set as the elapsed time from the acquisition of the authentication related information.

When the authentication related information is acquired in step 702, the CPU 200 analyzes the acquired data using the parser function illustrated in FIG. 4 (step 703).

Next, based on the polling control information extracted using the parser function, the CPU 200 sets a time valid for printing the InvitePage (printing valid time) based on the authentication related information (step 704). The printing valid time is a time "T0–T1" (for example, 25 minutes), which is obtained by subtracting the time "T1" (for example, 5 minutes), which is required for the user to register the MFP 101 with the site using the URL of the InvitePage, from the authentication valid time "T0" (for example, 30 minutes) for an authentication URL.

The authentication valid time "T0" is a period of time up to the expiry time of authentication processing based on the authentication related information set at the site A 103. The authentication valid time is included, as period information, in the authentication related information (FIG. 4) acquired in step 702, and is acquired from the period information. For example, even if an authentication valid time set for the site B 104 (for example, 60 minutes) is different from the authentication valid time set for the site A 103, the authentication valid time is acquired from the authentication related information, and therefore an authentication valid time corresponding to each site can be acquired.

Furthermore, "T1" includes the time for printing the InvitePage and the time for operating the PC 105 by the user. The operation time of the PC 105 is a time for accessing the URL of the InvitePage by the PC 105 and inputting a user code, and the like. The printing time varies depending on the state of the MFP 101 (for example, depending on whether printing is being performed or whether there is a shortage of ink or paper). Therefore, the CPU 200 may detect the state of the MFP 101, and "T1" may be dynamically set according to the state.

In step 705, the CPU 200 generates a printing page from the information (URL information and user-code) for generating the InvitePage extracted using the parser function in step 703.

In step 706, the CPU 200 acquires an elapsed time T2, which is the time elapsed from the acquisition of the authentication related information in step 702.

In step 707, the CPU 200 determines whether or not to print the InvitePage generated in step 705, in accordance with a condition based on the acquisition of the authentication related information in step 702. Specifically, regarding a condition that the elapsed time set in step 706 does not exceed the printing valid time set in step 704 (time is not out), a determination is made as to whether or not the condition is satisfied. Specifically, when Expression 1 provided below is satisfied, it is determined that time is out and the condition for printing is not satisfied accordingly. In contrast, when Expression 1 is not satisfied, it is determined that time is not out and the condition for printing is satisfied accordingly.

$$T0-T1<T2 \quad \text{Expression 1}$$

In other words, a determination is made as to whether or not printing of the InvitePage and registration of the MFP 101 (time T1) are executable during the remaining valid time (T0–T2).

When Expression 1 is satisfied, the CPU 200 determines that the elapsed time has exceeded the printing valid time, and discards the InvitePage generated in step 705 accordingly (step 708). Then, the process returns to step 702, and the InvitePage information is acquired again.

In step 708, regardless of whether or not printing of the InvitePage by the MFP 101 is possible, that is, even if printing is possible, the InvitePage is discarded so that printing is not executed. Therefore, the InvitePage whose printing valid time has passed and which cannot be used for authentication accordingly can be prevented from being printed.

At this time, a registration request of the API-20 is issued again to the relay server 102 and the authentication related information is acquired again. Therefore, new URL and user code which are different from the discarded InvitePage, and an InvitePage for which a new authentication valid time is set, are generated in step 705. One of a URL and a user code needs to be new and the other may be the same as that for the previous InvitePage.

When Expression 1 is not satisfied, it is determined that the elapsed time is within the printing valid time, and the process proceeds to step 709. In step 709, the CPU 200 starts printing of the InvitePage by the printing unit 209. In step 710, the CPU 200 determines whether or not the printing of the InvitePage is completed. When the printing is completed, the process of FIG. 7 ends.

When it is determined in step 710 that the printing is not completed, the process proceeds to step 711. In step 711, the CPU 200 determines whether or not an error from a cause, such as ink shortage or a paper jam, which may not be resolved without an intervention by an operator, has occurred. When it is determined in step 711 that such an error has occurred, the CPU 200 determines whether or not the MFP 101 has been recovered from the error state (step 712). If no error has occurred (No in step 711), the CPU 200 continues printing. If the MFP 101 has not been recovered from the error (No in step 712), the CPU 200 waits for error recovery.

In step 712, if the CPU 200 determines that the MFP 101 has been recovered from the error state, the process returns to the processing of setting the elapsed time in step 706 and the processing of determining whether time is out in step 707. If the authentication valid time has passed, the authentication related information is acquired again in step 702, as described above.

In the case where an error occurs during printing of the InvitePage, printing is therefore interrupted, and time is not out when the error is resolved, printing is resumed from the point before the process is interrupted in step 709. In contrast, if time is out when the error is resolved, printing of the current page is canceled, and the sheet of the print medium on which printing is being performed is discharged.

According to the process illustrated in FIG. 7, in the case where an error occurs after the start of printing, when the error is resolved, it is determined whether or not the elapsed time (T2) from acquisition of the authentication related information exceeds the printing valid time (T0–T1). For example, for printing of the InvitePage, running out of ink, a paper jam, or other errors may occur. In such a case, the elapsed time (T2) from the acquisition of the authentication related information may exceed the printing valid time (T0–T1) before the user completes an operation for causing the MFP 101 to recover from the error, resulting in authentication related information being invalidated. By performing the determination in step 707, the InvitePage based on the invalidated authentication related information is prevented from being printed even if the printing of the InvitePage is possible. Therefore, a print sheet and a recording material can be prevented from being wasted.

When the authentication related information is invalidated, new authentication related information is automatically acquired in step 702 without the user issuing the registration instruction again in step 701. Therefore, the user is able to print the InvitePage within the printing valid period, without issuing the registration instruction after the operation for recovery from an error.

Furthermore, in determining whether or not time is out, instead of "T0", which is the authentication valid time for the authentication URL, "T0–T1", which takes into consideration "T1" that is the time required to perform an operation for registering the MFP 101 using the URL of the InvitePage, is compared with the elapsed time T2. For example, assuming that "T0", which is the authentication valid time of the authentication URL, is 30 minutes, when the elapsed time T2 is 29 minutes and 59 seconds, there is an allowance of only one second for printing the InvitePage and for an operation on the PC 105 by the user. However, in reality, the operations will not be completed in one second. Therefore, in the first embodiment, "T0–T1", which is shorter than the above time "T0", is set as the printing valid time. In this example, it is assumed that the above time "T1" is five minutes. However, arbitrary time may be set.

In the first embodiment, the determination of step 707 is performed, based on the elapsed from a reference time, which is the time at which the authentication related information is acquired in step 702. However, the determination is not limited to the above example. The printing validity time may be set in step 707, and the determination may be made as to whether the current time is before or after the print validity time in step 707.

Figures 17, 18:
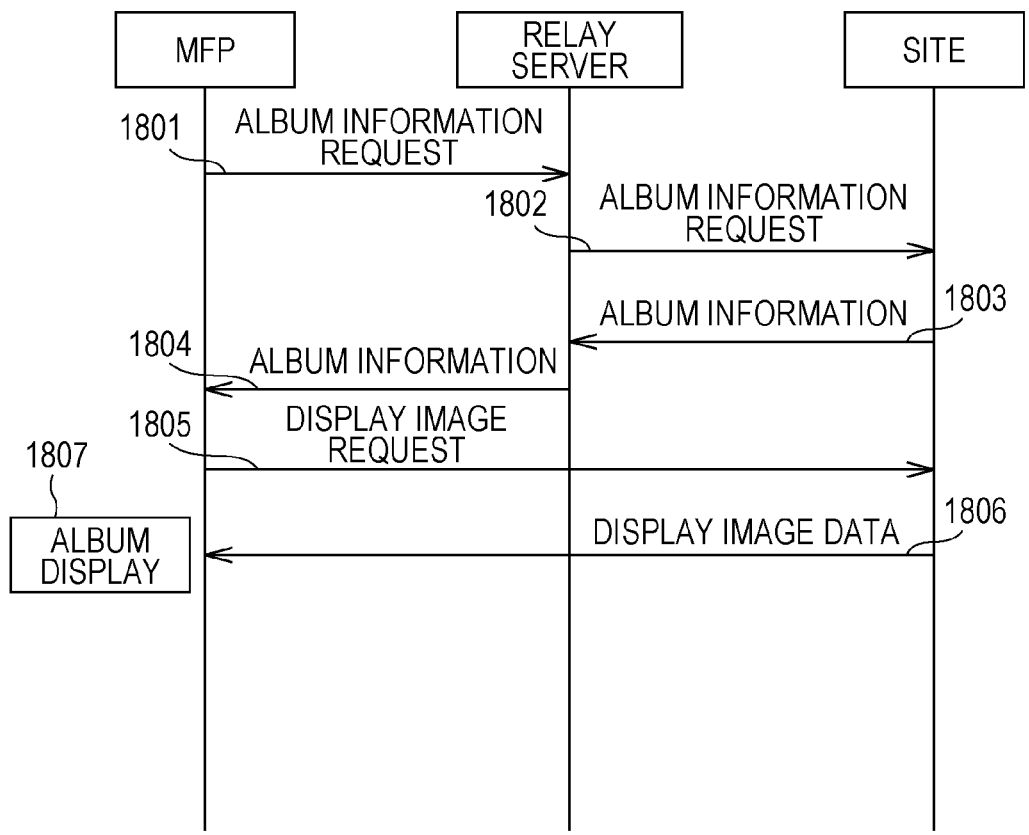
FIG. 17 is a diagram illustrating an example of an album information request issued in step 1802.
FIG. 18 is a transition diagram illustrating a process performed by the MFP to display album information by using the access token acquired in the process illustrated in FIG. 6.

FIG. 18 is a transition diagram illustrating a process performed by the MFP 101 to display an album by using the access token acquired by the process illustrated in FIG. 6.

In step 1801, the MFP 101 issues a request for album information to the relay server 102 through the API-1000, together with the access token stored in the storage management area of the nonvolatile RAM 205 in step 611 of FIG. 6. In step 1802, the relay server 102 converts the album information request acquired in step 1801 into an API of the site designated by the album information request, and issues a request for the album information to the site.

FIG. 17 is a diagram illustrating an example of the album information request issued in step 1802. In this example, the album information is requested by a Get method. In the album information request, a URL of the target site of a request for album information, account information (1) at the time of the use of the site, and an album (2) as a service to be used, are designated. Furthermore, as the right of use of (2), information of the access token (3) is added. The server of the site receives information which includes (1) to (3) mentioned above, and the MFP 101 is permitted to acquire the album information from the site.

After the permission for use is confirmed at the server of the site, the server provides the album information to the relay server 102 (step 1803). Within the site, device identification information for identifying the MFP 101 is registered in association with the account information. In step 1803, the server transmits to the relay server 102 the device identification information corresponding to the account information (1), together with the album information.

The relay sever 102 converts the album information into information designated by the MFP 101, and provides the converted information to the MFP 101 (step 1804). The album information includes layout information which indicates the location where an image is positioned and the size of the image, information (file name) for identifying the image, and the like. Furthermore, the relay server 102 may identify the MFP 101 as the transmission destination of the album information, based on the device identification information received from the site.

In step 1805, the MFP 101 parses the album information acquired in step 1804, and requests image data necessary for displaying the album from the site (step 1805). The request for the image data is issued by using the file name included in the album information. In response to the request for the image data, the server of the site transmits the image data to the MFP 101 (step 1806). The MFP 101 rasterizes the image data acquired in step 1806, in accordance with the layout information included in the album information, and causes the display unit 206 to display the album.

In the example described above, an access token is issued to the MFP 101, and the access token is used when the MFP 101 acquires an image as a printing target, which is selected by the user through an operation on the MFP 101. However, the present invention is not limited to a service in which the MFP 101 requests an image from a site. A service in which selection of an image and instruction for printing of the image are performed through a device, such as a PC or a smartphone, may also be included in the present invention.

When the user utilizes such a service, the user first accesses a site through a device, such as a PC or a smartphone, and inputs a user account managed within the site. The server of the site authenticates the user account, and presents to the user images corresponding to the account. The user selects a printing target from among the presented images, and issues a print instruction.

As described above, the device identification information and the user account are registered with the server of the site in association with each other. In accordance with the print instruction issued by the user, the server transmits a print job and the device identification information for the MFP 101 to the relay server 102. The relay server 102 identifies the MFP 101, based on the device identification information, and transmits the print job to the MFP 101.

Thus, processing in the first embodiment and processing in the subsequent embodiments described below are not limited to a service of issuing an access token to the MFP 101, but may be applied to various services of registering a client apparatus such as the MFP 101 with the site. The printing target is not limited to an image but may be a document, a table, and the like. Furthermore, when a site provides a Web email service, an email may be a printing target.

As described above, according to the first embodiment, in the case where the elapsed time from the acquisition of the InvitePage by the MFP 101 exceeds the printing valid time, even if printing is possible by the MFP 101, the MFP 101 is controlled so as not to perform printing of the InvitePage. Therefore, a print sheet and a recording material, such as ink or toner, can be prevented from being wasted by printing an invalid InvitePage.

Furthermore, when printing is not performed, an InvitePage is regenerated automatically. Therefore, the user is able to cause a valid InvitePage to be printed easily. Regeneration of an InvitePage is not necessarily performed automatically. For example, an inquiry screen for inquiring the user whether or not to perform regeneration may be displayed on the display unit 206 of the MFP 101, and in accordance with an instruction by the user on the screen, regeneration may be performed.

Second Embodiment

In the first embodiment, as illustrated in FIG. 7, after the InvitePage is discarded in step 708, authentication related information is reacquired in step 702. In a second embodiment, an example is provided in which instead of reacquiring an InvitePage, a user is notified that the InvitePage has been discarded.

Figure 8:
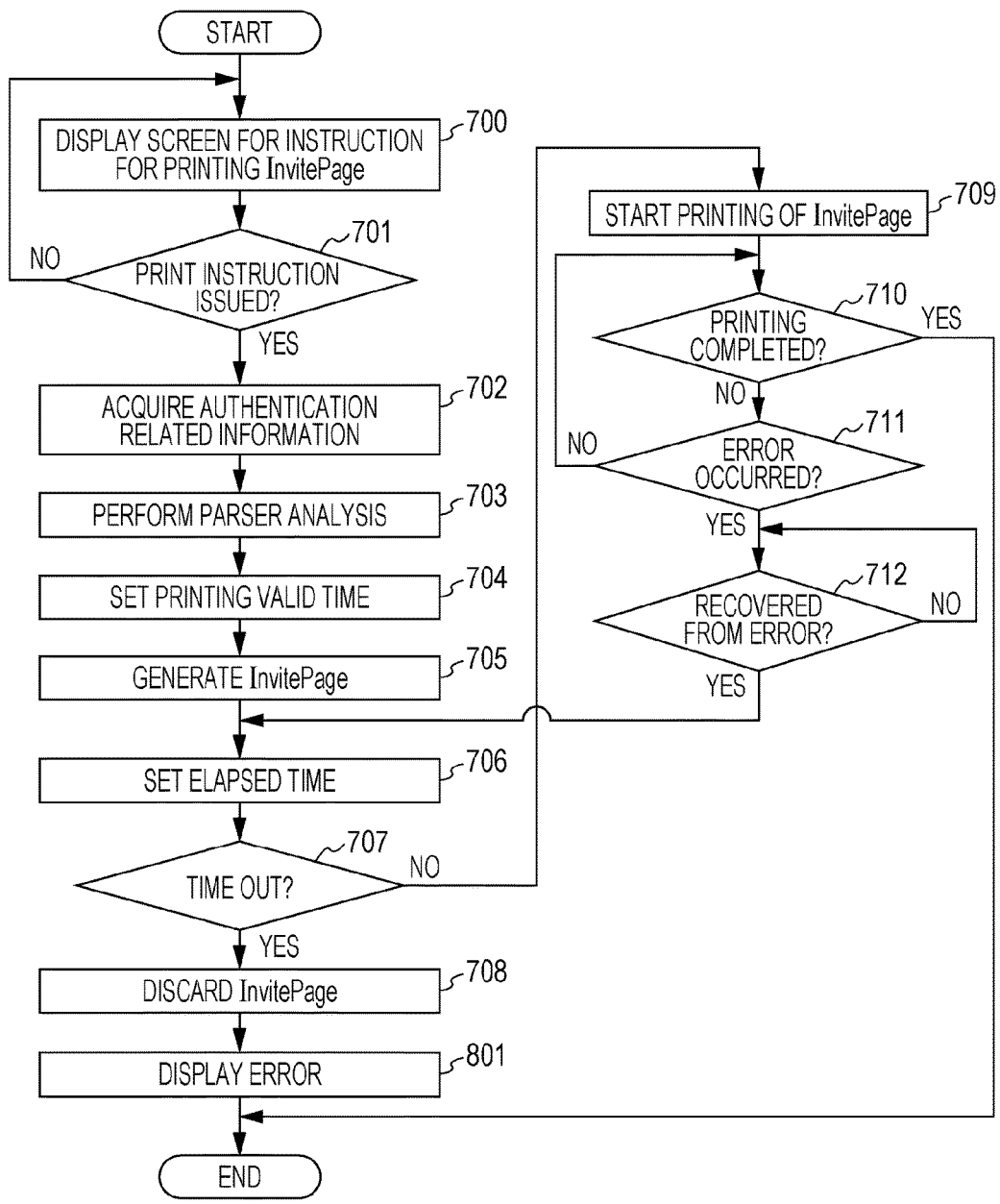
FIG. 8 is a diagram illustrating an example of a process performed by the MFP to print an InvitePage in a second embodiment.

FIG. 8 is a diagram illustrating an example of a process performed by the MFP 101 to print an InvitePage in the second embodiment.

A detailed description will be omitted for the processing which is in common with that of FIG. 7. When the InvitePage is discarded in step 708, the CPU 200 causes the display unit 206 to display an error display for informing the user that the InvitePage will not be printed (step 801). As an error display method, a character indicating an error may be displayed, or the occurrence of an error may be indicated by lighting or flashing of a light emitting diode (LED) or the like.

According to the process of FIG. 8, if an authentication validity period expires due to an error occurrence during printing of the InvitePage, the MFP 101 ends the process without reacquiring authentication related information. The user may execute acquisition of the InvitePage by redisplaying a registration instruction screen in step 700 to issue a registration instruction.

Therefore, for example, in case it takes a long time for error recovery, it is possible to prevent the reacquisition of the authentication related information from being executed many times despite being in a state in which printing may not be performed. The user then confirms the display in step 801, and by reissuing a registration instruction when the MFP 101 enters a state in which execution of printing is possible, the InvitePage may be printed.

Third Embodiment

In a third embodiment, a configuration is illustrated in which the MFP 101 and a server of a site are able to communicate without via the relay server 102. The MFP 101 is responsible for the role that is performed by the relay server 102 in a different embodiment. Other configuration contents are similar to those of FIG. 1.

Figure 9:
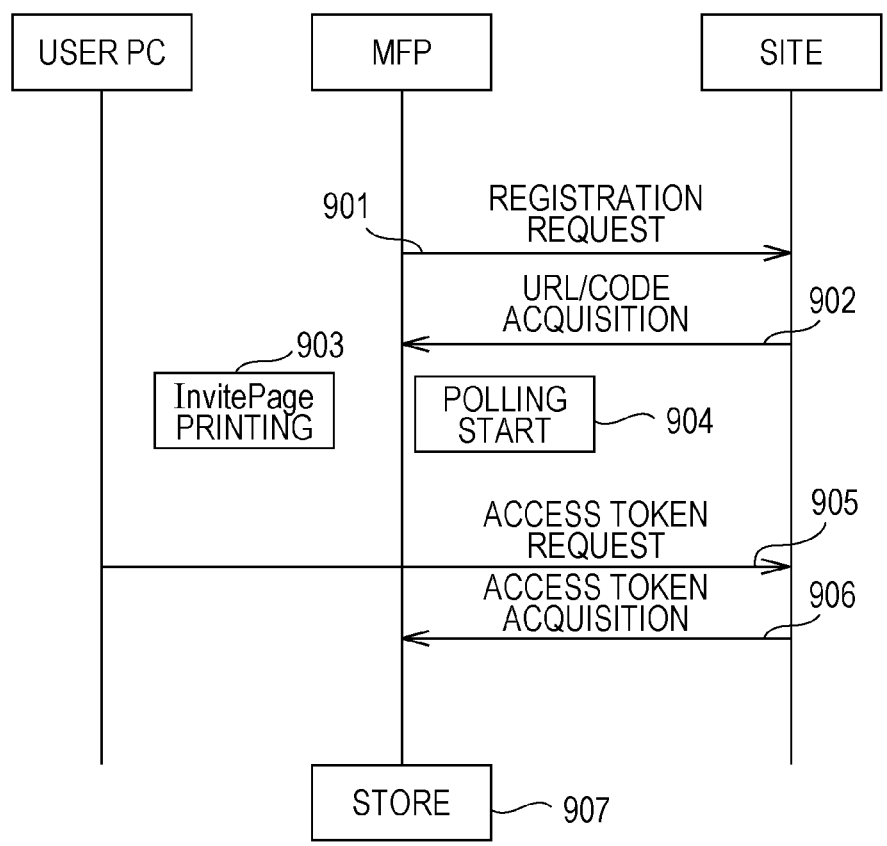
FIG. 9 is a transition diagram for explaining a process performed by the MFP to acquire the right to use the site A in a third embodiment.

FIG. 9 is a transition diagram for explaining a process performed by the MFP 101 to acquire the right of use of the site A 103 in the third embodiment.

First, the MFP 101 issues a registration request using an API of the site A 103 (step 901). In response to the registration request, the site A 103 returns the information illustrated in FIG. 5 including the authentication URL (step 902). The MFP 101 analyzes acquired data using a parser, and generates an InvitePage by extracting information required for generating the InvitePage. Furthermore, a time at which the response was received is set as a reference time. Moreover, polling control information (cycle and period) is acquired in the parser analysis. The MFP 101 prints the generated InvitePage (step 903). Then, the MFP 101 starts polling to the site (step 904). In this example, the polling is performed for 30 minutes at the longest at cycles of 5 seconds until the right of use is issued. The user connects the MFP 101 with the URL information described in the InvitePage printed by the MFP 101 through the PC 105 which has a Web browsing function, and causes the site A 103 to grant the MFP 101 the right of use (step 905). The site A 103 issues an access token/refresh token in response to the polling performed immediately after the issuance of the right of use. The MFP 101 stores the acquired access token/refresh token (step 906/907).

Fourth Embodiment

The processes of FIG. 7 and FIG. 8 provide examples in which the MFP 101 acquires authentication related information in accordance with a user instruction for printing an InvitePage. In a fourth embodiment, an example is provided in which the MFP 101 acquires authentication related information in advance before a print instruction is performed and an InvitePage is printed in accordance with a print instruction by a user.

Figure 10:
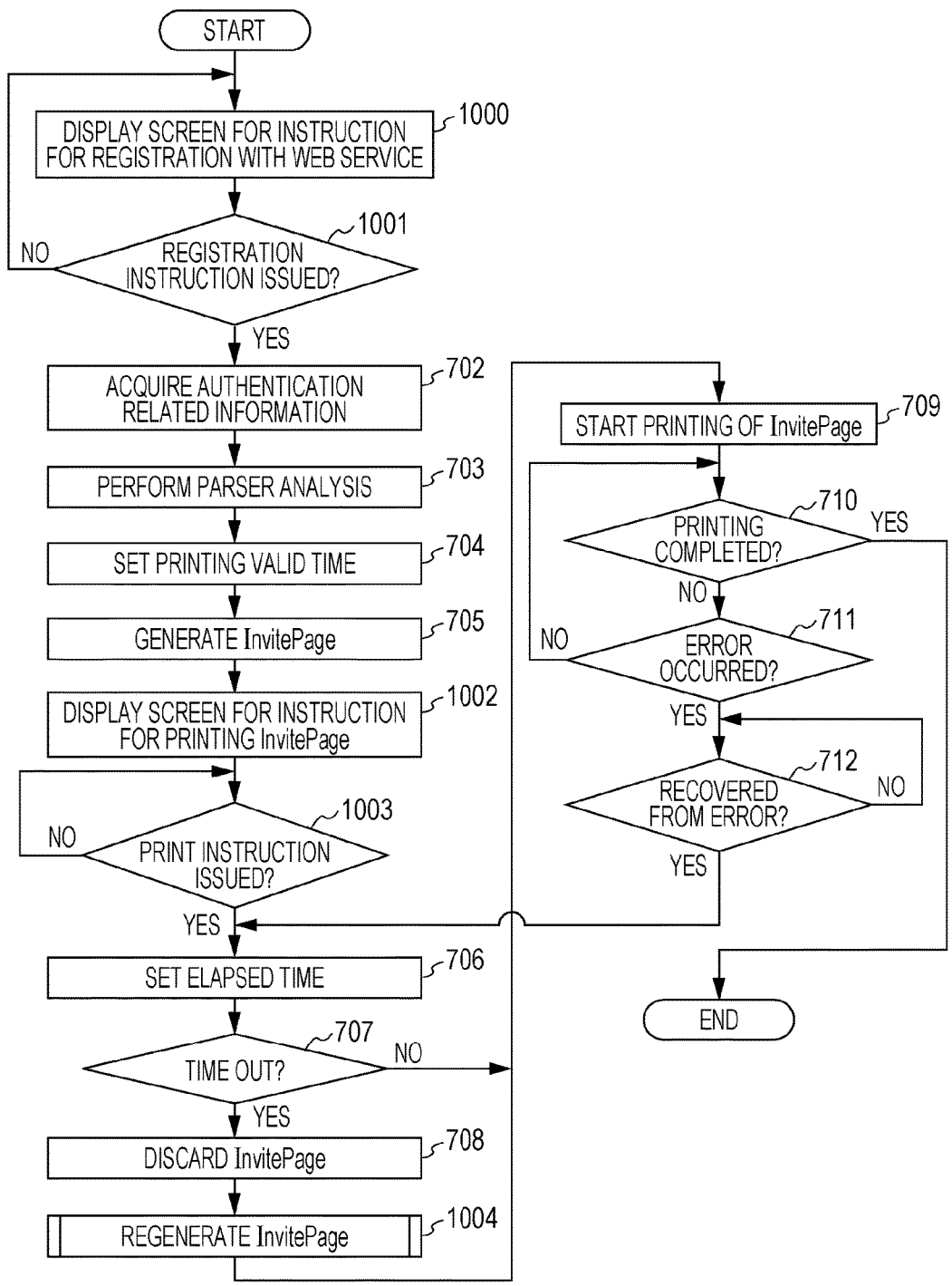
FIG. 10 is a diagram illustrating an example of a process for printing an InvitePage in a fourth embodiment.

FIG. 10 is a diagram illustrating an example of a process for printing an InvitePage in the fourth embodiment. A flowchart illustrated in FIG. 10 is executed by the CPU 200 included in the MFP 101, as in FIG. 7 and FIG. 8.

In step 1000, the CPU 200 causes the display unit 206 to display a screen with which a user issues an instruction for registration of the MFP 101 with the site A 103 or the site B 104. In step 1001, the CPU 200 determines whether the user has issued an instruction for registration using the operating unit 201. When the registration instruction has been issued by the user, the MFP 101 issues a registration request to the relay server 102. Then, an InvitePage is generated by the processing of steps 702 to 705. Details of the processing of steps 702 to 705 are as illustrated in FIG. 7.

When the InvitePage is generated, the CPU 200 causes the display unit 206 to display a screen with which the user issues an instruction for printing the InvitePage in step 1002. Then, in step 1003, the CPU 200 determines whether or not a print instruction has been issued by the user.

When a print instruction has been issued by the user, it is determined, by the processing of steps 706 and 707, whether or not a valid period of the InvitePage has timed out. If the valid period has not timed out, the printing of the InvitePage starts in step 709. If the valid period has timed out, the InvitePage is discarded in step 708. The processing of steps 706 to 709 is as illustrated in FIG. 7. Furthermore, the processing of steps 710 to 712 is similar to that in FIG. 7, and therefore a description for the similar processing will be omitted.

When the InvitePage is discarded in step 708, an InvitePage is regenerated in step 1004. In step 1004, the same processing as that of steps 702 to 705 is executed. Furthermore, if authentication related information is acquired in step 1004 as in step 702, a reference time is set for elapsed time measurement.

In FIG. 10, an InvitePage is generated (steps 702 to 705) before the user issues an instruction for printing the InvitePage (step 1003). Therefore, the printing may be started quickly when the user issues the instruction for printing the InvitePage.

However, the valid period of the InvitePage is measured, based on the acquisition of the authentication related information in step 702 as the reference time. Therefore, when there is a delay in the print instruction by the user, it is determined in step 707 that time is out.

Since the regeneration of the InvitePage is executed in the step 1004, it is possible to print a valid InvitePage even after time is out. Furthermore, when it is determined that time is out, the processing of steps 1002 and 1003 is not performed. That is, when time is out, regeneration and printing of the InvitePage is automatically performed, without a print instruction being newly issued by the user. Therefore, it is possible to easily print a valid InvitePage without printing an invalid InvitePage.

Fifth Embodiment

As described in the foregoing embodiments, the MFP 101 receives a print job with a valid period. Next, an example will be provided in which printing of a print job with a valid period is prioritized over printing of a print job without a valid period.

The RAM 204 of the MFP 101 may also be used as a storage area for spooling print jobs. Hereinafter, management by the CPU 200 for print jobs spooled within the RAM 204 will be described.

FIG. 12 is a diagram illustrating jobs within a spooler. Specifically, FIG. 12 illustrates print jobs accumulated in the spooler other than the job that is currently being printed. Print jobs in the spooler are managed by job IDs. Furthermore, as management information, presence/absence information, which indicates whether or not a valid period is present, and expiry time if there is a valid period, are stored in association with a job ID. In the example of FIG. 12, job IDs 101, 103, and 104 indicate jobs which do not have a valid period, and job IDs 102 and 105 indicate jobs which have a valid period. In the fifth embodiment, an example is provided in which a print job of an InvitePage is a job with a valid period and the current time is 12:25.

As described above, in step 604 of FIG. 6, the MFP 101 is able to acquire a validity period (for example, 30 minutes) of a print job to print an InvitePage. Thus, in a case where a print job received by the MFP 101 includes a validity period, the CPU 200 stores the validity period as information illustrated in FIG. 12 in the RAM 204.

Figure 11:
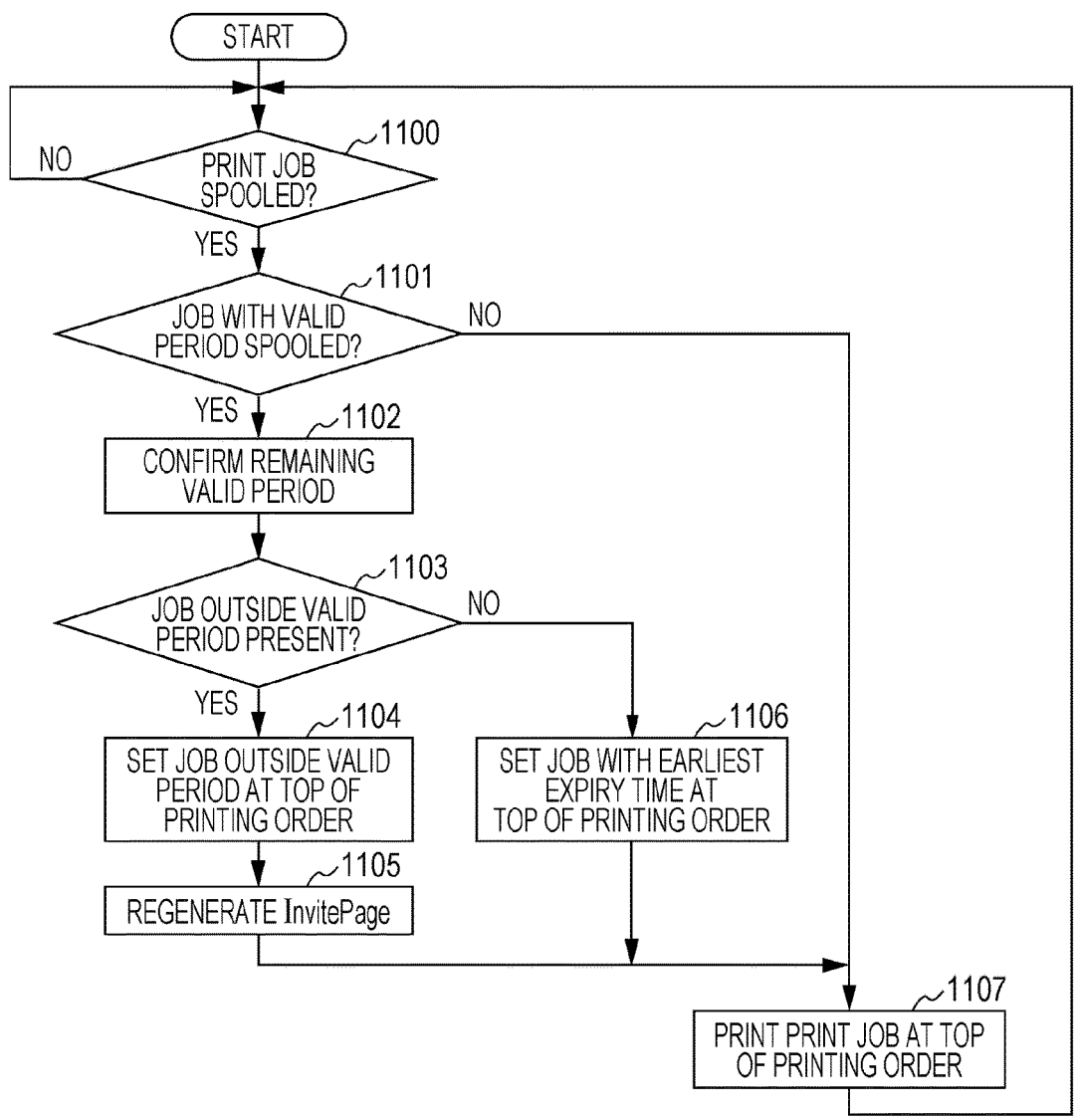
FIG. 11 is a diagram illustrating an example of a management process for a print job.

FIG. 11 is a diagram illustrating an example of a management process for a print job according to the fifth embodiment. The process illustrated in FIG. 11 is implemented when the CPU 200 executes a program within the ROM 203. Furthermore, the process illustrated in FIG. 11 is executed for all the jobs that are accumulated in the spooler when that print job currently being printed is completed and the CPU 200 extracts the next print job from the spooler.

In step 1100, the CPU 200 determines whether or not a print job is spooled. When a print job is spooled, the process proceeds to step 1101.

In step 1101, the CPU 200 determines whether or not a print job with a valid period is spooled. When a print job with a valid period is spooled, a remaining valid time, "T0'" is confirmed (step 1102). The remaining valid time is the difference between the current time and the expiry time, which is illustrated in FIG. 12.

In step 1103, the CPU 200 determines whether or not a print job outside a validity period is present. Specifically, the determination is made based on a time "T1" (for example, five minutes), which is the time required to perform an operation for registering the MFP 101 using the URL of the InvitePage, and a time "T3" (for example, two minutes), which is the time up to the completion of the job that is currently being executed. Then, when Expression 2 is satisfied, it is determined that a print job outside a valid period is present.

$$T1+T3>T0'  \quad\quad \text{Expression 2}$$

That is, it is not determined whether or not there is a remaining valid time, but it is determined whether or not execution of printing of the InvitePage and registration of the MFP 101 is possible within the remaining valid time. The time up to the completion of the job that is currently being executed may be dynamically set according to the amount of data as a printing target in the job. Furthermore, when there is no job that is currently being executed, the time may be set to "zero minutes".

For example, in the case of the job ID 102, the remaining valid time "T0'" is calculated as fifteen minutes, based on the relationship between the current time and the expiry time.

Thus, since Expression 2 is not satisfied, the print job corresponding to the job ID 102 is determined to be within the validity period. In contrast, in the case of the job ID 105, the remaining valid time "T0'" is calculated as five minutes, based on the relationship between the current time and the expiry time. Thus, Expression 2 is satisfied. Therefore, the print job corresponding to the job ID 105 is determined to be outside the validity period.

In step 1104, the CPU 200 sets the print job that is determined to be outside the validity period in step 1103 at the top level (printing order 1) of the printing order in the list illustrated in FIG. 12. Incidentally, if there are multiple jobs outside the validity period, a job whose printing order is the earliest is set at the top level.

In step 1105, the CPU 200 regenerates an InvitePage. This processing is similar to the processing of steps 702 to 705 in FIG. 7.

On the other hand, when it is determined in step 1103 that there is no print job outside the validity period, the print job with a valid period is set at the top level of the printing order. When there are multiple print jobs with a valid period, a job whose printing order is the earliest is set at the top level, or a job whose expiry time is the earliest is set at the top level (step S1106).

In step 1107, the CPU 200 causes the printing unit 209 to execute printing, in accordance with the print job at the top level of the printing order.

FIG. 13 is a diagram illustrating print jobs after the printing order is changed. In the example of FIG. 12, the print job of the job ID 105 is determined to be outside the validity period. Therefore, by the processing of step 1104, the print job of the job ID 105 moves to the top of the printing order within the spooler. Then, in step 1105, the InvitePage is reacquired. In step 1107, the InvitePage is printed.

As described above, the print job of the InvitePage that is managed in the spooler is printed preferentially over print jobs with no validity period. Therefore, it is possible to reduce the chance of executing reacquisition of InvitePage information and to effectively utilize the InvitePage information that has already been acquired.

In the example of FIG. 11, the print job outside the valid period is set at the top level. However, since the valid period is updated by regeneration of the InvitePage, another print job within the valid period may be printed preferentially over the print job outside the valid period.

Next, an example in which after InvitePages corresponding to all the print jobs outside the valid period are regenerated, the printing order is rearranged in the order of closeness to the expiry time will be described.

Figure 14:
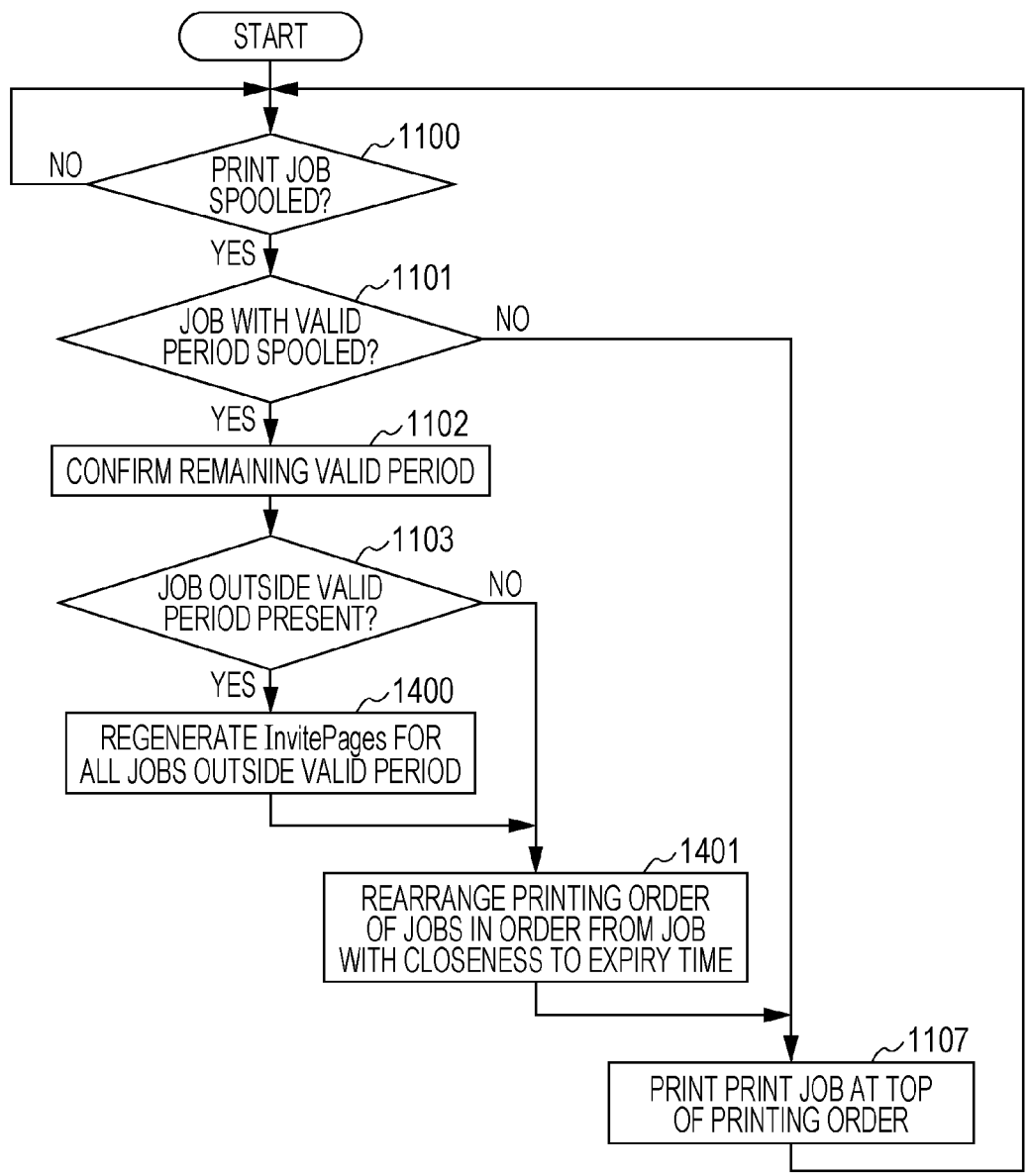
FIG. 14 is a diagram illustrating an example of a management process for a print job.

FIG. 14 is a diagram illustrating an example of a management process for a print job. As in the example of FIG. 11, it is assumed that the current time is 12:25 and the print jobs illustrated in FIG. 12 are spooled in the spooler.

The processing of steps 1100 to 1103 in FIG. 14 is similar to that in FIG. 11.

In step 1103, when it is determined that a print job outside the valid period is present, the process proceeds to step 1400. In step 1400, InvitePages for all the print jobs outside the valid period are regenerated. For the processing of regenerating the InvitePages, the processing of steps 702 to 705 in FIG. 7 is executed for each print job. When the regeneration of the InvitePages is completed, the process proceeds to step 1401.

In step 1401, the CPU 200 changes the printing order of the print jobs in the order of closeness to the expiry time. The priority of a job without a valid period is lower than a job with a valid period. Furthermore, when multiple jobs without a valid period are present, the priority level in the printing order before the rearrangement is maintained.

FIG. 15 is a diagram illustrating print jobs whose printing order has been changed by the processing of step 1401. In the table illustrated in FIG. 12, the print job of the job ID 105 is determined to be outside the valid period in step 1103. Then, in step 1401, regeneration of the InvitePage is executed. Therefore, the valid period is updated and the expiry time is thus updated to 12:48, which is after 23 minutes of the current time, which is 12:25. This "23 minutes" is a time obtained by subtracting the time for the user to perform registration processing using the printed InvitePage (5 minutes) and the time remaining up to completion of the job that is currently being executed (2 minutes) from the validity period of the InvitePage in the server of the site (30 minutes). The time up to the completion of the job that is currently being executed may be dynamically set according to the amount of data of a printing target in the job. When there is no job that is currently being executed, the time may be set to "zero minutes".

By the above processing, the print job of ID 105 which is outside the valid period is replaced with a reacquired print job, and the time up to the expiry time becomes longer. After the time up to the expiry time is extended in this way, a change in the printing order is executed in step 1401.

Then, as is clear from FIG. 15, the print job of the job ID 102 has been changed into the top level of the printing order. In other words, in the state of FIG. 12, which is before the change, the expiry time of the print job of the job ID 105 is earlier than the expiry time of the print job of the job ID 102. However, by the regeneration of the InvitePage, the expiry time of the job ID 105 becomes later. Therefore, the job ID 102 is prioritized.

In the fifth embodiment, the spooler is described with a configuration using a storage area inside the MFP 101. However, the spooler may be located in an external area on the network.

Sixth Embodiment

Prior to execution of printing, the MFP 101 may perform a recovery operation of the recording head included in the printing unit 209. An example of the recovery operation includes suction of ink adhered to the recording head. A specific length of time is required to execute a recovery operation. Therefore, the validity of printing of an InvitePage may differ depending on the presence or absence of the recovery operation.

Furthermore, the MFP 101 may be in an exclusive state by control other than the printing of an InvitePage. In such a case, the printing of the InvitePage may not be performed immediately. Therefore, the validity of the printing of the InvitePage may differ depending on whether or not the MFP 101 is in the exclusive state.

Therefore, in a sixth embodiment, a process for re-determining whether or not printing of an InvitePage is valid is executed when the MFP 101 is in the exclusive state at the time of printing or when the MFP 101 performs a recovery operation.

Figure 16:
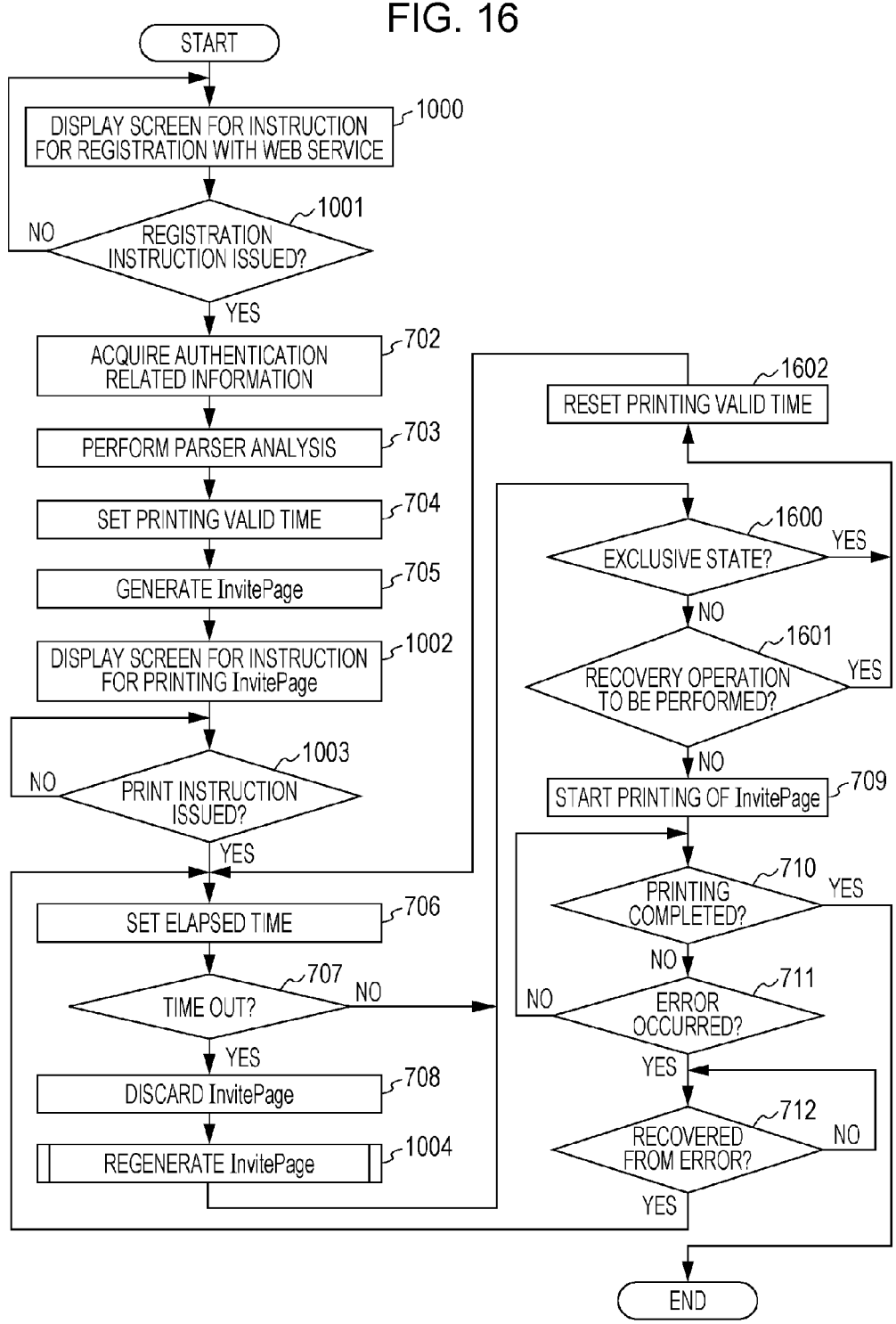
FIG. 16 is a diagram illustrating an example of a process for printing an InvitePage in a sixth embodiment.

FIG. 16 is a diagram illustrating an example of a process for printing an InvitePage according to the sixth embodiment. In FIG. 16, a description will be omitted for the processing which is in common with that of FIG. 10.

When it is determined in step 707 that the printing of the InvitePage has not timed out (is valid) or when an InvitePage is regenerated in step 1004, the process proceeds to step 1600.

In step 1600, the CPU 200 determines whether or not the MFP 101 is in the exclusive state. When the MFP 101 is not in the exclusive state, the CPU 200 determines whether or not to perform a recovery operation in the printing in step 1601.

When the determination result in step 1600 or step 1601 is "Yes", the process proceeds to step 1602. In step 1602, the CPU 200 resets a printing valid time.

For example, it is assumed that the authentication valid time of a site is represented by "T0" and the time required for a user to perform an operation for registering the MFP 101 using the URL of the InvitePage is represented by "T1". In addition, it is assumed that the time for transition from the exclusive state to a normal state is represented by "T4" and the time required for the recovery operation is represented by "T5".

In step 1602, for example, when it is determined in step 1600 that the MFP 101 is in the exclusive state, the CPU 200 subtracts the T4 from the printing valid time. For example, if the printing valid time is represented by (T0−T1), in step 1602, the time represented by (T0−T1−14) is set as a new printing valid time.

On the other hand, when it is determined in step 1601 that a recovery operation is to be performed, the time T5 is subtracted from the printing valid time. For example, if the printing valid time is represented by (T0−T1), in step 1602, the time represented by (T0−T1−T5) is set as a new printing valid time.

When determination results of both step 1600 and step 1601 are "Yes", the time represented by (T0−T1−T4−T5) is set in step 1602. However, in this case, the processing of step 1602 is executed twice. Therefore, for example, by performing the processing of step 1600 and step 1601 in one determination process, a single subtraction processing may be performed by selecting, from among the times T4, T5, and T4+T5, the time to be subtracted from the printing valid time in accordance with the determination result.

In step 707, it is determined, by comparing the printing valid time which has been reset in step 1062 with the elapsed time, whether or not the printing of the InvitePage has timed out.

Ink suction of the recording head has been described as an example of a recovery operation. However, a recovery operation is not limited to this but may be various maintenance operations. For example, for sheet printing and reading for registration adjustment to adjust the timing to eject ink from the recording head, the time required for the maintenance operation may be subtracted from the printing valid time, similarly to the recovery operation. In the case where the time required differs depending on the type of recovery operation and maintenance operation, the time corresponding to the type may be subtracted from the printing valid time.

According to the process of FIG. 16 described above, the determination as to whether or not time is out is performed by subtracting the time required for the recovery operation or for recovering from the exclusive state, from the printing valid time. With such a determination, it may be appropriately determined whether or not the printing of the InvitePage is valid, an invalid InvitePage may be prevented from being printed, and a valid InvitePage may be printed.

Seventh Embodiment

In the foregoing embodiments, the validity of the printing of an InvitePage is determined based on a printing valid time.

In a seventh embodiment, instead of the printing valid time, a determination is made as to whether or not a delay event which delays the start of printing has occurred or whether or not an error has occurred during a printing operation. In accordance with the determination result, discarding and regeneration of an InvitePage is performed.

Figure 19:
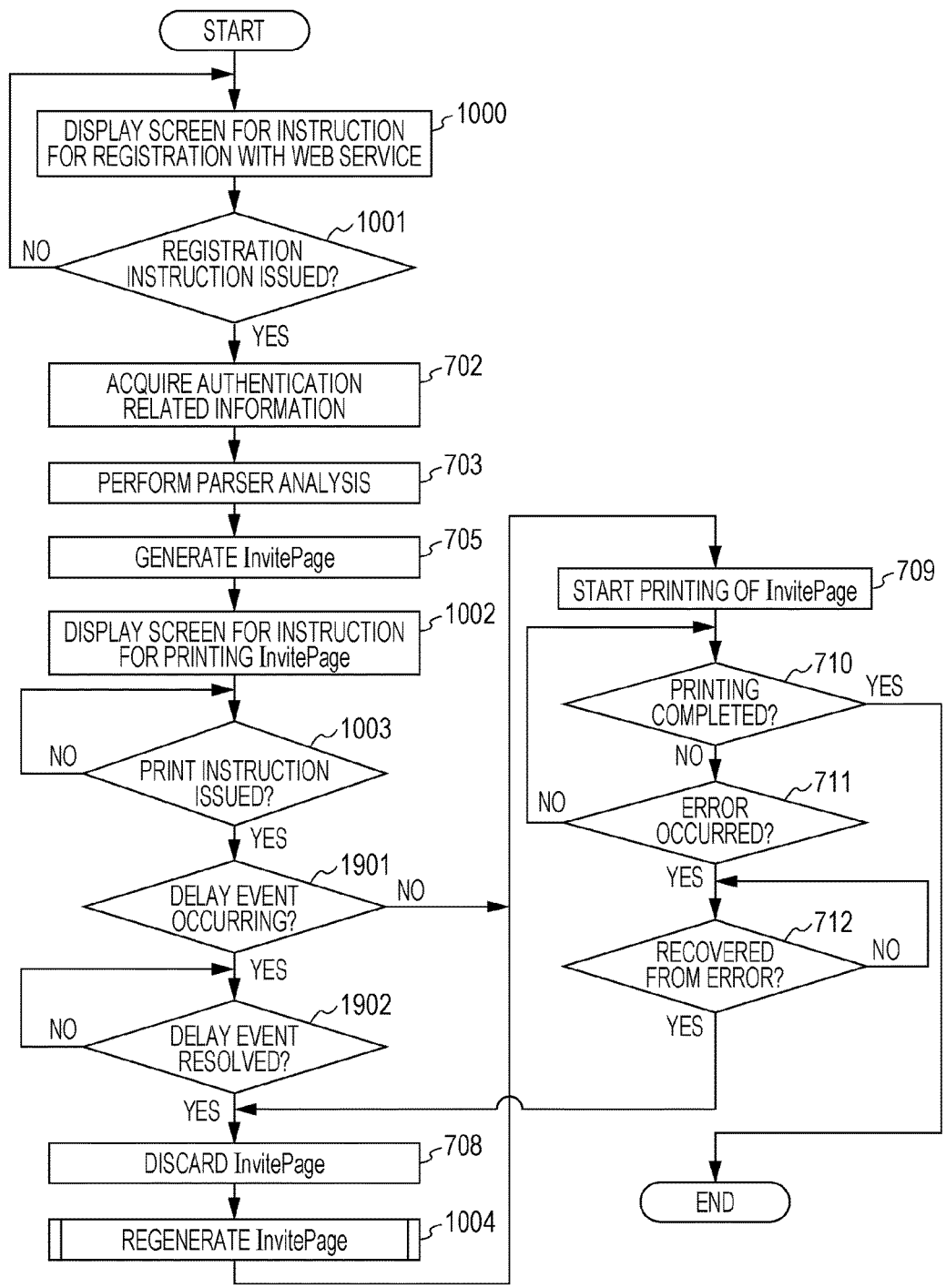
FIG. 19 is a diagram illustrating an example of a process for printing an InvitePage in a seventh embodiment.

FIG. 19 is a diagram illustrating an example of a process for printing an InvitePage according to the seventh embodiment. A description for processing similar to that of FIG. 10 will be omitted.

When an instruction for printing an InvitePage is input by a user in step 1003, the CPU 200 determines whether or not a delay event is occurring in step 1901. A delay event is processing which occurs before execution of a print job. Specifically, a delay event is a recovery operation for performing suction of ink or registration adjustment.

When it is determined in step 1901 that a delay event is occurring, the CPU 200 determines whether or not the delay event has been resolved in step 1902. When it is determined that the delay event has been resolved, discarding and regeneration of the InvitePage is executed.

Furthermore, in step 711, it is determined whether or not an error such as running out of ink, running out of paper, or a paper jam has occurred during printing. After the error has been resolved, discarding and regeneration of the InvitePage is executed.

That is, in the seventh embodiment, in accordance with the presence or absence of a factor for delaying the completion of printing (a delay event before printing or an error occurring during printing), the validity of the printing of the InvitePage is determined. Therefore, compared to the case in which the above determination is performed based on a printing valid time, it is easier to perform the determination.

Furthermore, for example, in the case of a delay event such as a recovery operation or waiting for completion of another print job, it is comparatively easy to predict the time for the delay event to be resolved by the MFP 101. Therefore, in the case of such a delay event, the determination may be performed based on a printing valid time. In contrast, an error such as recovering from the exclusive state, shortage of ink, running out of paper, or a paper jam may not be resolved without user intervention. Therefore, it is comparatively difficult to predict the time for such an event to be resolved. Thus, in the case of the occurrence of such an event, the discarding and regeneration of the InvitePage may be performed regardless of the printing valid time, as illustrated in FIG. 19.

In the foregoing embodiments, a photo sharing site has been described as an example of a service provided by a server on the Web. However, a service provided by a server is not limited to this. For example, a cloud print service may be provided. In the cloud print service, when a user issues a print instruction using a device, such as a PC or a smartphone, connected to the Internet, an MFP is notified of the print instruction via a server that provides the service. Upon receiving the print instruction, the MFP executes printing. In addition, print data may be transmitted along with the print instruction to the MFP, and the MFP may print the print data. Alternatively, the MFP may be notified of information indicating the storage location of the print data (URL) or the like as a print instruction, and the MFP may acquire the print data based on the information.

Furthermore, a service provided by a site may be a storage service which stores various data such as documents, images, tables, and graphs. Alternatively, a Web email service or a social network service (SNS) may be provided by a site.

Furthermore, the relay server 102 and a server of a site may each be constructed as a single server or may each be a server system including multiple servers. In the case of a server system including multiple servers, a server may be allocated to each function or multiple servers having a common function may be provided.

Furthermore, if the valid period of the URL of an authentication page expires in the foregoing embodiments, authentication using the URL is prohibited in the site. As a prohibiting method, the access itself according to the URL may be prohibited, or an error display may be executed after the access is made.

Furthermore, in the foregoing embodiments, as a print control device which performs print control processing, the case where the CPU 200 of the printing apparatus operates has been explained as an example. However, the present invention is not limited to this. An external device which is connected to the printing apparatus may operate as a print control device according to an embodiment of the present invention. In such a case, the external device may be various devices such as a PC, a smartphone, and a tablet.

In the foregoing embodiments, an example in which a client apparatus accesses a server on the Web via the Internet has been described. However, the present invention is not limited to this. For example, the client apparatus may access a server on a LAN. In such a case, access information may be folder path information, for example, instead of a URL.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, a program code for implementing functions of an embodiment may be executed by a single computer (a CPU or a microprocessing unit (MPU)) or may be executed by multiple computers which cooperate with each other. Furthermore, a program code may be executed by a computer or hardware, such as a circuit for implementing the functions of the program code, may be provided. Furthermore, part of the program code may be implemented by hardware and the other parts may be executed by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-127489, filed Jun. 20, 2014, which is hereby incorporated by reference herein in its entirety.

What is claimed is:

1. A system comprising:

a server; and a printing apparatus which includes a memory storing at least one program, at least one processor configured to execute the at least one program, and a printing unit, wherein the server transmits to the printing apparatus predetermined information which includes access information to be used for accessing the server and authentication information to be used for authentication by the server and which has a valid period set for the authentication, and the server executes authentication processing based on the authentication information if the access based on the access information and input of the authentication information are made before the valid period has expired, wherein the at least one processor included in the printing apparatus acquires the predetermined information transmitted by the server, wherein the at least one processor determines whether to print the predetermined information, based on whether or not an elapsed time from the acquisition of the predetermined information exceeds a predetermined time shorter than the valid period, and wherein if the elapsed time exceeds the predetermined time and the at least one processor determines not to print the predetermined information, the at least one processor causes the printing unit not to print the predetermined information even if the elapsed time does not exceed the valid period, and if the elapsed time does not exceed the predetermined time and the at least one processor determines to print the predetermined information, the at least one processor causes the printing unit to print the predetermined information for the authentication by the server, wherein the system includes, as the server, each of a first server which transmits first predetermined information having a first valid period as the predetermined information and a second server which transmits second predetermined information having a second valid period shorter than the first valid period as the predetermined information, wherein the at least one processor of the printing apparatus acquires the first predetermined information and first period information regarding the first valid period, or the second predetermined information and second period information regarding the second valid period, wherein, in a case where the first predetermined information and the first period information are acquired, the at least one processor sets a first time shorter than the first valid period, based on the first period information, as the predetermined time, and wherein, in a case where the second predetermined information and the second period information are acquired, the at least one processor sets a second time shorter than both of the first time and the second valid period, based on the second period information, as the predetermined time.

2. The system according to claim 1, wherein the at least one processor of the printing apparatus sets the first time based on the first period information and a state of the printing apparatus, and sets the second time based on the second period information and the state of the printing apparatus.

3. The system according to claim 1, wherein if the elapsed time exceeds the predetermined time, the at least one processor of the printing apparatus reacquires the predetermined information for accessing the server.

4. The system according to claim 3, wherein the at least one processor of the printing apparatus performs first acquisition of the predetermined information in accordance with an instruction by a user, and if an elapsed time from the first acquisition exceeds the predetermined time, the at least one processor performs second acquisition of the predetermined information without a new instruction being issued by the user.

5. The system according to claim 1, wherein the at least one processor of the printing apparatus causes the printing unit to start printing of the predetermined information, and if the predetermined time has passed before the printing of the predetermined information is completed, the at least one processor of the printing apparatus controls the printing to be canceled.

6. The system according to claim 1, wherein if multiple print jobs are spooled as print jobs of the predetermined information, the at least one processor of the printing apparatus causes the printing unit to perform printing based on each of the multiple print jobs in accordance with a printing order based on a valid period set for the predetermined information corresponding to each of the multiple print jobs.

7. The system according to claim 1, wherein the server one or more servers executes, based on the authentication processing, processing for registering the printing apparatus with the server.

8. The system according to claim 1, wherein if the elapsed time exceeds the predetermined time, even if the state of the printing apparatus is a predetermined state in which printing of the predetermined information is possible, the at least one processor of the printing apparatus does not cause the printing unit to print the predetermined information.

9. The system according to claim 8, wherein the predetermined state is a state in which an error which was occurring if the predetermined information was acquired is resolved.

10. The system according to claim 1, wherein the server transmits the predetermined information to the printing apparatus via another server which is different from the server.

11. A printing apparatus that is connectable to a server that transmits predetermined information which includes access information to be used for accessing the server and authentication information to be used for authentication by the server and which has a valid period set for the authentication, and that executes authentication processing based on the authentication information if the access based on the access information and input of the authentication information are made before the valid period has expired, the printing apparatus comprising:
a memory storing at least one program;
at least one processor configured to execute the at least one program; and
a printing unit,
wherein the at least one processor included in the printing apparatus acquires the predetermined information transmitted by the server,
wherein the at least one processor determines whether to print the predetermined information, based on whether or not an elapsed time from the acquisition of the predetermined information exceeds a predetermined time shorter than the valid period, and
wherein if the elapsed time exceeds the predetermined time and the at least one processor determines not to print the predetermined information, the at least one processor causes the printing unit not to print the predetermined information even if the elapsed time does not exceed the valid period, and if the elapsed time does not exceed the predetermined time and the at least one processor determines to print the predetermined information, the at least one processor causes the printing unit to print the predetermined information for the authentication by the server,
wherein the printing apparatus is connectable to, as the server, each of a first server which transmits first predetermined information having a first valid period as the predetermined information and a second server which transmits second predetermined information having a second valid period shorter than the first valid period as the predetermined information,
wherein the at least one processor acquires the first predetermined information and first period information regarding the first valid period, or the second predetermined information and second period information regarding the second valid period,
wherein, in a case where the first predetermined information and the first period information are acquired, the at least one processor sets a first time shorter than the first valid period, based on the first period information, as the predetermined time, and
wherein, in a case where the second predetermined information and the second period information are acquired, the at least one processor sets a second time shorter than both of the first time and the second valid period, based on the second period information, as the predetermined time.

12. The printing apparatus according to claim 11, wherein the at least one processor of the printing apparatus sets the first time based on the first period information and a state of the printing apparatus, and sets the second time based on the second period information and the state of the printing apparatus.

13. The printing apparatus according to claim 11, wherein if the elapsed time exceeds the predetermined time, the at least one processor of the printing apparatus reacquires the predetermined information for accessing the server.

14. The printing apparatus according to claim 13, wherein the at least one processor of the printing apparatus performs first acquisition of the predetermined information in accordance with an instruction by a user, and if an elapsed time from the first acquisition exceeds the predetermined time, the at least one processor performs second acquisition of the predetermined information without a new instruction being issued by the user.

15. The printing apparatus according to claim 11, wherein the at least one processor of the printing apparatus causes the printing unit to start printing of the predetermined information, and if the predetermined time has passed before the printing of the predetermined information is completed, the at least one processor of the printing apparatus controls the printing to be canceled.

16. The printing apparatus according to claim 11, wherein if multiple print jobs are spooled as print jobs of the predetermined information, the at least one processor of the printing apparatus causes the printing unit to perform printing based on each of the multiple print jobs in accordance with a printing order based on a valid period set for the predetermined information corresponding to each of the multiple print jobs.

17. The printing apparatus according to claim 11, wherein the server executes, as the processing based on the access, processing for registering the printing apparatus with the server.

18. The printing apparatus according to claim 11, wherein if the elapsed time exceeds the predetermined time, even if the state of the printing apparatus is a predetermined state in which printing of the predetermined information is possible, the at least one processor of the printing apparatus does not cause the printing unit to print the predetermined information.

19. The printing apparatus according to claim 18, wherein the predetermined state is a state in which an error which was occurring if the predetermined information was acquired is resolved.

20. The printing apparatus according to claim 11, wherein the server transmits the predetermined information to the printing apparatus via another server which is different from the server.

21. A control method for a system including a server and a printing apparatus, the method comprising:
transmitting, with the server, predetermined information which includes access information to be used for accessing the server and authentication information to be used for authentication by the server and which has a valid period set for the authentication, to the printing apparatus;
acquiring, with the printing apparatus, the transmitted predetermined information;
determining whether to print the predetermined information, based on whether or not an elapsed time from the acquisition of the predetermined information exceeds a predetermined time shorter than the valid period;
performing, with the printing apparatus, control such that if the elapsed time exceeds the predetermined time and it is determined not to print the predetermined information, the printing apparatus does not print the predetermined information even if the valid period has not expired, and if the elapsed time does not exceed the predetermined time and it is determined to print the predetermined information, the printing apparatus prints the predetermined information for the authentication by the server; and
executing, with the server, authentication processing based on the authentication information if the access based on the transmitted access information and input of the authentication information are made before the valid period has expired,
wherein the system includes, as the server, each of a first server which transmits first predetermined information having a first valid period as the predetermined information and a second server which transmits second predetermined information having a second valid period shorter than the first valid period as the predetermined information,
wherein the printing apparatus acquires the first predetermined information and first period information regarding the first valid period, or the second predetermined information and second period information regarding the second valid period,
wherein, in a case where the first predetermined information and the first period information are acquired, the printing apparatus sets a first time shorter than the first valid period, based on the first period information, as the predetermined time, and
wherein, in a case where the second predetermined information and the second period information are acquired, the printing apparatus sets a second time shorter than both of the first time and the second valid period, based on the second period information, as the predetermined time.

* * * * *